United States Patent
Watanabe et al.

(10) Patent No.: US 8,661,214 B2
(45) Date of Patent: Feb. 25, 2014

(54) STORAGE SYSTEM AND DATA MIGRATION PROCESSING CONTROL METHOD

(75) Inventors: Haruaki Watanabe, Isehara (JP); Hidenori Suzuki, Atami (JP)

(73) Assignee: Hitachi, Ltd., Tokyo (JP)

( * ) Notice: Subject to any disclaimer, the term of this patent is extended or adjusted under 35 U.S.C. 154(b) by 303 days.

(21) Appl. No.: 13/263,996

(22) PCT Filed: Sep. 21, 2011

(86) PCT No.: PCT/JP2011/005294
§ 371 (c)(1),
(2), (4) Date: Oct. 12, 2011

(87) PCT Pub. No.: WO2013/042163
PCT Pub. Date: Mar. 28, 2013

(65) Prior Publication Data
US 2013/0073820 A1    Mar. 21, 2013

(51) Int. Cl.
*G06F 13/00* (2006.01)
(52) U.S. Cl.
USPC .......................... 711/162; 711/119; 711/154
(58) Field of Classification Search
USPC ......................................... 711/119, 154, 162
See application file for complete search history.

(56) References Cited

U.S. PATENT DOCUMENTS

| | | | |
|---|---|---|---|
| 6,467,034 B1 | 10/2002 | Yanaka | |
| 7,594,076 B2 * | 9/2009 | Tsumagari et al. | 711/114 |
| 2005/0027737 A1 | 2/2005 | Micka et al. | |
| 2006/0195666 A1 | 8/2006 | Maruyama et al. | |
| 2008/0082748 A1 | 4/2008 | Liu et al. | |
| 2008/0244035 A1 | 10/2008 | Horie | |
| 2011/0082988 A1 | 4/2011 | Kono et al. | |

FOREIGN PATENT DOCUMENTS

| | | |
|---|---|---|
| JP | 2008-84254 A | 4/2008 |
| JP | 2011-81467 A | 4/2011 |

* cited by examiner

*Primary Examiner* — Reba I Elmore
(74) *Attorney, Agent, or Firm* — Mattingly & Malur, PC

(57) ABSTRACT

The present invention appropriately processes a write command issued during data migration processing, and completes the data migration processing promptly. A copy control part 7, in a case where write data targeted at a migration-source volume 3A has been received from a host 2 during data migration processing, selects and executes one of a synchronous copy process 6A and an asynchronous copy process 6B based on either any one or multiple pieces of prescribed information 7A through 7D. This enables write command processing according to a process mode complying a storage system condition.

13 Claims, 18 Drawing Sheets

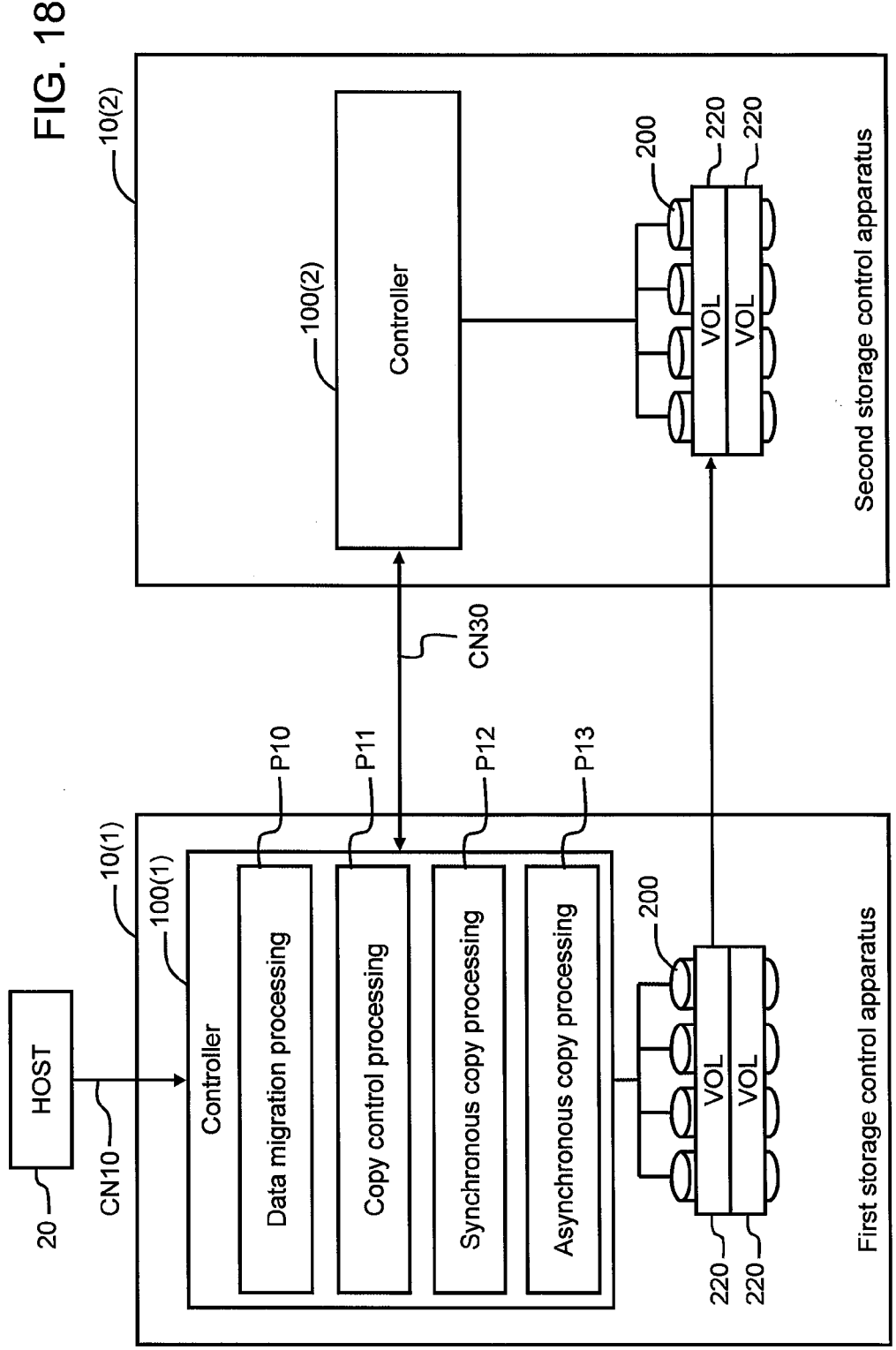

STORAGE SYSTEM AND DATA MIGRATION PROCESSING CONTROL METHOD

TECHNICAL FIELD

The present invention relates to a storage system and a control method for data migration processing.

BACKGROUND ART

Technology for changing the storage location of data in accordance with the either a data utilization frequency or a data life cycle is called data migration technology (Patent Literature 1 and 2). For example, response performance can be enhanced by migrating frequently used data to a higher speed logical volume. Migrating data with a low utilization frequency from a high-speed logical volume to a low-speed logical volume enables the high-speed logical volume to be utilized efficiently.

CITATION LIST

Patent Literature

[PTL 1]
Japanese Patent Application Laid-open No. 2011-081467
[PTL 2]
Japanese Patent Application Laid-open No. 2008-084254

SUMMARY OF INVENTION

Technical Problem

A storage system is required to operate non-stop 24 hours a day, 365 days a year. Therefore, a write access from a host computer has to be received even during data migration processing. In a case where migration-source volume data has been updated during data migration processing, the data of the migration-destination volume must also be updated.

As a method for making the migration-destination volume data match the migration-source volume data, a synchronous copy process and an asynchronous copy process are known. However, in the prior art, either the synchronous copy process or the asynchronous copy process is executed as standard. Therefore, a data migration process cannot be executed flexibly in according with either a user's wishes or the status of the storage system, resulting in poor usability.

The present invention was made with the foregoing problems in mind, and an object thereof is to provide a storage system and a method for controlling a data migration process for improving usability in a case where write data is received during data migration processing. Another object of the present invention is to provide a storage system and a method for controlling a data migration process, which make it possible to enhance usability and, in addition, suppress a drop in response performance by automatically selecting one of either the synchronous copy process or the asynchronous copy process for each piece of write data, which is issued by a higher-level apparatus during data migration processing.

Solution to Problem

To solve for the above-mentioned problems, a storage system according to the present invention is a storage system, which includes multiple logical volumes, and comprises a data migration processing part for executing a data migration process, which transfers the data of a migration-source volume selected from among multiple logical volumes and stores this data in a migration-destination volume selected from among multiple logical volumes, a synchronous copy processing part for executing an synchronous copy process, which notifies a higher-level apparatus that a write process has been completed after writing the write data received from the higher-level apparatus to the migration-source volume and the migration-destination volume, an asynchronous copy processing part for executing an asynchronous copy process, which notifies the higher-level apparatus that a write process has been completed upon writing the write data received from the higher-level apparatus to the migration-source volume, and writes thereafter the write data to the migration-destination volume, and a copy control part for selecting and executing one of the synchronous copy process and the asynchronous copy process based on prescribed information in a case where write data targeted at the migration-source volume is received from a higher-level apparatus during data migration processing.

The prescribed information includes migration policy information, number of write accesses information, migration destination load information, and access type information. The migration policy information is information that is specified beforehand for selecting either the synchronous copy process or the asynchronous copy process, the number of write accesses information denotes the number of write accesses to the migration-source volume per unit of time, the migration destination load information denotes the load on the migration-destination volume, and the access type information denotes whether a write access targeted at the migration-source volume is a random access or a sequential access. The configuration may be such that the copy control part selects the asynchronous copy process in a case where the migration policy information denotes the asynchronous copy process, and, in addition, the number of write accesses denoted in the number of write accesses information is equal to or less than a prescribed access threshold, or in a case where the migration policy denotes the asynchronous copy process, and, in addition, the load denoted in the migration destination load information exceeds a prescribed load threshold, or in a case where the migration policy information denotes the asynchronous copy process, and, in addition, the access type information denotes sequential access, and selects the synchronous copy process in all other cases.

The prescribed information includes migration policy information, which specifies beforehand whether the synchronous copy process or the asynchronous copy process is to be selected, and the copy control part may select the synchronous copy process in a case where the migration policy information denotes the synchronous copy process, and may select the asynchronous copy process in a case where the migration policy information denotes the asynchronous copy process.

The prescribed information includes number of write accesses information, which denotes the number of write accesses to the migration-source volume per unit of time, and the copy control part may select the asynchronous copy process in a case where the number of write accesses is equal to or less than a prescribed access threshold, and may select the synchronous copy process in a case where the number of write accesses exceeds the prescribed access threshold.

The prescribed information includes migration destination load information, which denotes the load on the migration-destination volume, and the copy control part may select the asynchronous copy process in a case where the load exceeds a prescribed load threshold, and may select the synchronous copy process in a case where the load is equal to or less than the prescribed load threshold.

The prescribed information includes access type information, which denotes whether a write access targeted at the migration-source volume is a random access or a sequential access, and the copy control part may select the asynchronous copy process in a case where the write access is a sequential access, and may select the synchronous copy process in a case where the write access is a random access.

The characteristic features of the present invention described hereinabove can be combined in various ways other than those stated. In addition, the present invention can also be understood as a computer program. The computer program is installed in a computer via either a communication medium or a recording medium.

BRIEF DESCRIPTION OF DRAWINGS

FIG. 1 shows an overview of the entire embodiment of the present invention.
FIG. 2 shows the overall hardware configuration of a computer system.
FIG. 3 is an illustration showing computer programs and management tables stored in a controller.
FIG. 4 shows the configurations of a migration management table, a volume management table, and a threshold management table.
FIG. 5 shows the configuration of difference information used in a data migration process.
FIG. 6 shows a setting screen for a data migration process.
FIG. 7 is an illustration showing how mapping information is switched before and after a data migration.
FIG. 8 is a flowchart showing a migration setting process.
FIG. 9 is a flowchart showing a data migration process.
FIG. 10 is a flowchart showing a copy control process.
FIG. 11 is a flowchart showing a synchronous copy process.
FIG. 12 is a flowchart showing an asynchronous copy process.
FIG. 13 is a flowchart showing a copy control process related to Example 2.
FIG. 14 is a flowchart showing a copy control process related to Example 3.
FIG. 15 is a flowchart showing a copy control process related to Example 4.
FIG. 16 is a flowchart showing a copy control process related to Example 5.
FIG. 17 is a continuation of the flowchart of FIG. 16.
[FIG. 18]
FIG. 18 is a schematic diagram of the configuration of a computer system related to Example 6.

DESCRIPTION OF EMBODIMENTS

Figure 1:
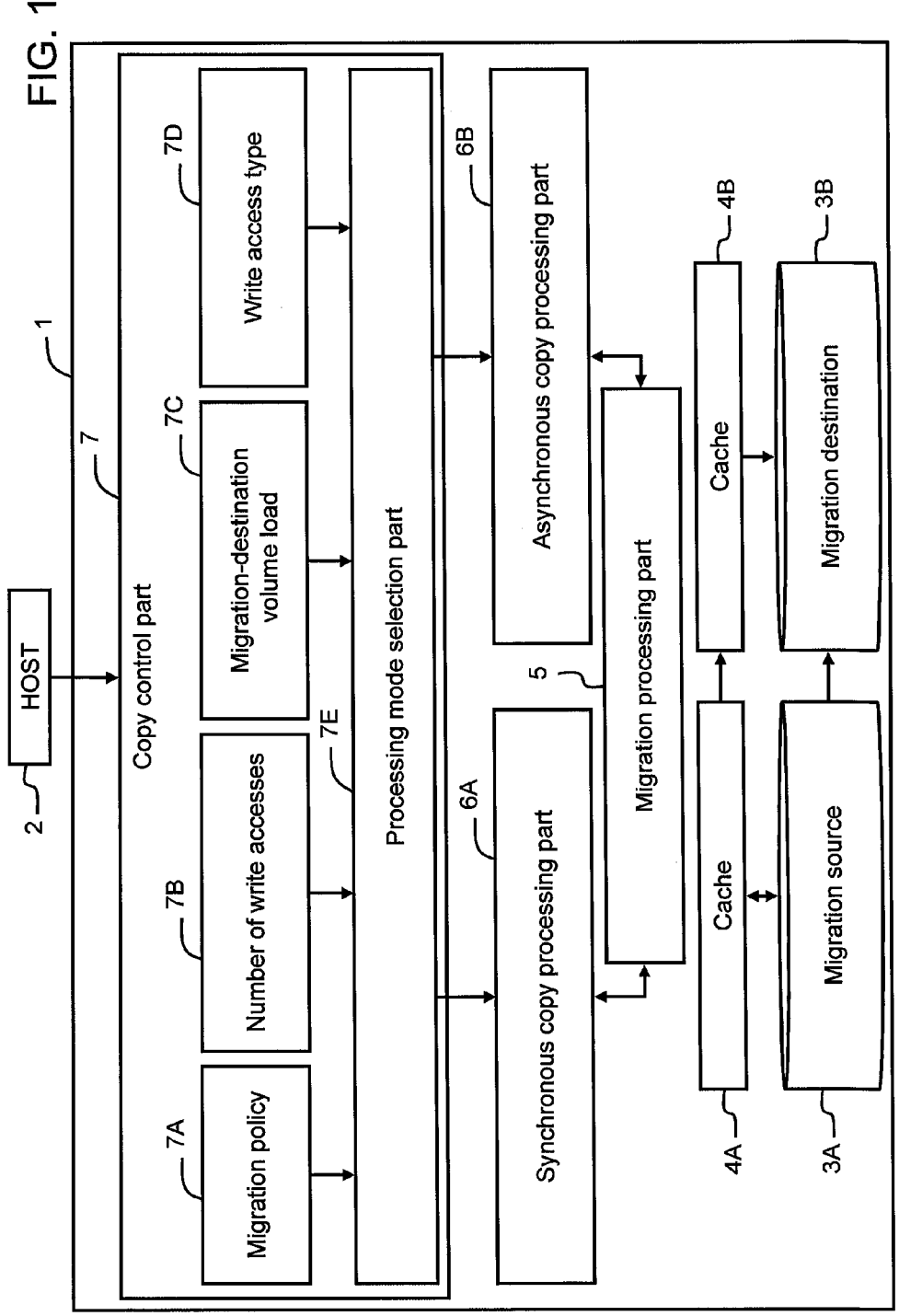
[FIG. 1]

An embodiment of the present invention will be explained below based on the drawings. FIG. 1 shows an overview of this embodiment. A storage system 1 is communicatably coupled to a host computer (hereinafter, host) 2, which serves as a "higher-level apparatus".

The storage system 1, for example, comprises multiple logical volumes 3A and 3B, cache memory areas 4A and 4B, a migration processing part 5, a synchronous copy processing part 6A, an asynchronous copy processing part 6B, and a copy control part 7.

The migration-source volume 3A and the migration-destination volume 3B are selected from among multiple logical volumes. The one cache memory area 4A corresponds to the storage space (logical address space (same holds true below)) of the migration-source volume 3A. The other cache memory area 4B corresponds to the storage space of the migration-destination volume 3B.

The migration processing part 5, which serves as the "data migration processing part", executes a data migration process, which transfers and stores the data of the migration-source volume 3A in the migration-destination volume 3B. In the following explanation, data migration may simply be called migration.

The synchronous copy processing part 6A executes a synchronous copy process. The synchronous copy process notifies the host 2 that write processing has been completed after writing the write data received from the host 2 to the migration-source volume 3A and the migration-destination volume 3B. Therefore, in the synchronous copy process, it takes a long time to respond to a write access request (may also be called a write request or a write command).

The asynchronous copy processing part 6B notifies the host 2 that write processing has been completed when the write data received from the host 2 is written to the migration-source volume 3A, and at a prescribed time thereafter writes the write data to the migration-destination volume 3B. Therefore, in the asynchronous copy process, the response time with respect to the write access request can be shortened. However, since the response time to the host 2 is short, large numbers of write access requests are issued, and it takes time to transfer the write data thereof to the migration-destination cache memory area 4B. Therefore, it takes a long time for data migration processing to be completed.

The process for writing data to a volume will be explained in detail. For example, in a case where data is to be written to the migration-source volume 3A, the data is stored in a prescribed location inside the cache memory area 4A corresponding to the migration-source volume 3A. The prescribed location corresponds to the logical address specified in the write command.

Thereafter, the data stored in the cache memory area 4A is transferred and written to the corresponding physical storage device in accordance with a destaging process. For example, either a hard disk drive or a flash memory device can be cited as the physical storage device. The destaging process transfers data in a cache memory to a physical storage device. Alternatively, a staging process is one that transfers data from a physical storage device to a cache memory.

In a case where data is to be written to the migration-destination volume 3B as well, the data is stored in a prescribed location inside the cache memory area 4B corresponding to the migration-destination volume 3B the same as was described hereinabove. Thereafter, the data is transferred from the cache memory area 4B to the physical storage device corresponding to the migration-destination volume 3B in accordance with a destaging process.

The copy control part 7 processes a write command issued from the host 2 during data migration processing. The copy control part 7 comprises various types of information 7A through 7D as either a portion or all of the "prescribed information", which constitutes the determination criteria for selecting a processing mode, and a processing mode selection part 7E for selecting one of either the synchronous copy process or the asynchronous copy process. The processing mode is for processing a write command during data migration processing.

Migration policy information 7A is information that a user specifies beforehand for selecting either the synchronous copy process or the asynchronous copy process. Prior to executing a data migration process, the user can select via a migration setting screen one of either a host I/O priority mode, which places priority on an access request from the host 2, or a migration priority mode, which places priority on a data migration process.

In a case where the migration policy information 7A is set to the migration priority mode, the processing mode selection part 7E selects the synchronous copy processing part 6A, and starts a synchronous copy process. In a case where the migration policy information 7A is set to the host I/O priority mode, the processing mode selection part 7E selects the asynchronous copy processing part 6B, and starts an asynchronous copy process.

Number of write accesses information 7B denotes the number of times that the host 2 write-accesses the migration-source volume 3A per unit of time. The processing mode selection part 7E selects the asynchronous copy process in a case where the number of write accesses to the migration-source volume 3A is equal to or less than a prescribed access threshold. The processing mode selection part 7E selects the synchronous copy process in a case where the number of write accesses to the migration-source volume 3A exceeds the prescribed access threshold.

The prescribed access threshold is set as the copying speed when data is copied from the migration-source volume 3A to the migration-destination volume 3B. The copying speed need not be considered in the strict sense, but rather may be an estimated value.

There is a correlation between the amount of write data written to the migration-source volume 3A and the number of write accesses to the migration-source volume 3A. In a case where the amount of write data per unit of time (the data write speed) is slower than the copying speed (data write speed<copying speed), the write data stored in the cache memory area 4A is transferred to the migration-destination cache memory area 4B over the course of time. Therefore, the processing mode selection part 7E selects the asynchronous copy process in a case where the data write speed is slower than the copying speed (the prescribed access threshold).

Alternatively, in a case where the data write speed is faster than the copying speed, the write data accumulates in the migration-source cache memory area 4A. To process the successively issued write access requests, it is necessary to create locations (slots) for writing the write data stored in the cache memory area 4A to the physical storage device relatively quickly and receiving new write data.

In order to complete the destaging process and to transfer the write data, which has been erased from the cache memory area 4A, to the migration-destination cache memory area 4B, the transfer-target write data must be read from the physical storage device to the cache memory area 4A. The transfer of data to the migration-destination cache memory area 4B is delayed by the time required for this staging process.

Consequently, the processing mode selection part 7E selects the synchronous copy process in a case where the data write speed is faster than the copying speed. The time it takes to make the data of the migration-destination volume 3B match up with the data of the migration-source volume 3A can be shortened by transferring the write data in the migration-source cache memory area 4A to the migration-destination cache memory area 4B prior to destaging being performed.

Migration-destination volume load information 7C denotes the load on the migration-destination volume 3B. More precisely, the migration-destination volume load information 7C denotes the load on the physical storage device in which the migration-destination volume 3B is disposed.

Multiple logical volumes can be created using a physical storage area of one or multiple physical storage devices. For example, it is assumed that either one of these logical volumes is used as a migration-destination volume, and that the other one logical volume is used by another host.

The load on the physical storage device increases when the other host accesses the other logical volume frequently. As a result of this, it takes a long time (the time required for a destaging process) to write data to a migration-destination volume that uses a shared physical storage device. For this reason, write data awaiting a destaging process steadily accumulates in the migration-destination cache memory area 4B, eliminating locations for new write data to be received.

When the free areas of the migration-destination cache memory area 4B dwindle, it takes time to transfer data from the migration-source cache memory area 4A to the migration-destination cache memory area 4B. In a case where the synchronous copy process has been executed, it takes a long time for the synchronous copy processing to be completed.

Consequently, the processing mode selection part 7E selects the asynchronous copy process in a case where the load on the migration-destination volume 3B exceeds the prescribed load threshold. This is because, in the asynchronous copy process, processing-complete can be notified to the host 2 by just storing the write data in the migration-source cache memory area 4A and there is no need to transfer this write data to the migration-destination cache memory area 4B right away. Alternatively, the processing mode selection part 7E selects the synchronous copy process in a case where the load on the migration-destination volume 3B is equal to or less than the prescribed load threshold.

Write access type information 7D, which serves as the "access type information", distinguishes between whether a write access to the migration-source volume 3A is a random access or a sequential access.

In the case of sequential access, selecting the asynchronous copy process can shorten the data transfer time since sequential access is characterized by writing data to successive multiple storage areas. This is because sequentially accessed write data can be stored in the migration-source cache memory area 4A in a relatively short period of time. Alternatively, in the case of random access, even selecting the synchronous copy process has little effect since random access is characterized by writing data to multiple storage areas that are dispersed.

Consequently, the processing mode selection part 7E selects the asynchronous copy process in the case of sequential access, and selects the synchronous copy process in the case of random access.

Thus, in this embodiment, in a case where write data is written to the migration-source volume 3A during data migration processing, one of either the synchronous copy process or the asynchronous copy process is selected and executed based on the prescribed information 7A through 7D. This makes it possible to process a write access request during data migration in accordance with the status of the storage system 1, thereby enhancing usability. In addition, since one of either the synchronous copy process or the asynchronous copy process is selected as the appropriate process, copy processing can be executed relatively quickly, and data migration processing can be completed promptly.

As will become clear from the example explained below, a determination as to whether to select the synchronous copy process or the asynchronous copy process can also be made by combining the prescribed information 7a through 7D. In addition, it is also possible to combine information 7A with information 7B, information 7A with information 7C, information 7A with information 7D, information 7B with information 7C, information 7B with information 7D, and information 7C with information 7D.

For example, when information 7A is combined with information 7B and a processing mode is selected, the asynchronous copy process is selected in a case where the host I/O priority mode is specified in the migration policy information 7A and, in addition, the number of write accesses to the migration-source volume 3A per unit of time is equal to or less than the prescribed access threshold. Examples will be explained below.

EXAMPLE 1

Example 1 of the present invention will be explained by referring to FIGS. 2 through 12. The corresponding relationship with FIG. 1 will be explained first. A storage system 10 corresponds to the storage system 1, a host 20 corresponds to the host 2, a logical volume 220 corresponds to the logical volumes 3A and 3B, and a cache memory 160 corresponds to the cache memories 4A and 4B. A data migration processing program P10 shown in FIG. 3 corresponds to the migration processing part 5, a copy control program P11 corresponds to the copy control part 7, a synchronous copy processing program P12 corresponds to the synchronous copy processing part 6A, and an asynchronous copy processing program P13 corresponds to the asynchronous copy processing part 6B. A portion of the information inside a migration management table T11 corresponds to the prescribed information 7A through 7D.

Figure 2:
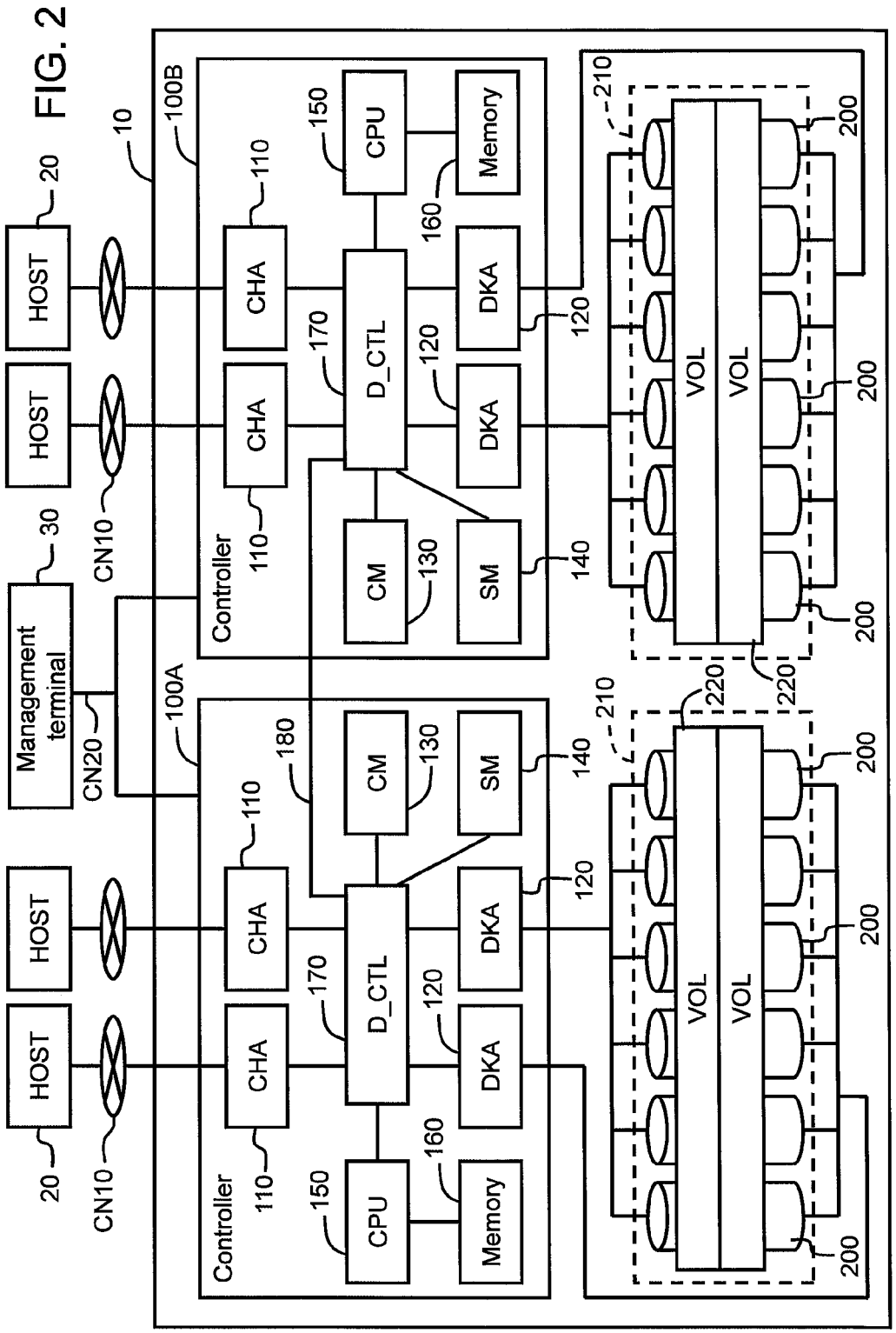
[FIG. 2]

FIG. 2 shows the hardware configuration of the storage system 10. The storage system 10, for example, comprises multiple controllers 100A and 100B and multiple storage devices 200. A redundant configuration is realized with the controller 100A and the controller 100B, and even in a case where either one of the controllers shuts down due to a failure or the like, the other controller controls the operation of the storage system 10 in its place. In a case where no particular distinction is made, the controllers 100A and 100B will be called the controller 100.

The controller 100, for example, comprises multiple channel adapters (hereinafter CHA) 110, multiple disk adapters (hereinafter DKA) 120, a cache memory 130, a shared memory 140, a microprocessor (hereinafter CPU) 150, a local memory 160, and a data controller 170.

The CHA 110, which serves as a "higher-level communication interface circuit", comprises multiple communication ports, and these communication ports are coupled to the host 20 to enable two-way communications via a communication network CN10. The communication network CN10, for example, can be configured as an IP-SAN (Internet Protocol-Storage Area Network) or a FC-SAN (Fibre Channel-Storage Area Network). The CHA 110 receives a command from the host 20 and responds to the host 20 with the results of this command processing.

The DKA 120, which serves as a "lower-level communication interface circuit", is coupled to multiple storage devices 200 so as to enable two-way communications via a SAN or the like. The DKA 120 either writes data stored in the cache memory 130 to the storage device(s) 200, or transfers data inside the storage device(s) 200 to the cache memory 130.

The cache memory 130 stores data (write data) received from the host 20 and data (read data) read from the storage device(s) 200.

The shared memory 140, which serves as a "control memory", is jointly used by the respective CHA 110, respective DKA 120, and the CPU 150. Various types of management information T11 through T13 (refer to FIG. 3) required for managing the storage system 10 are stored in the shared memory 140.

The CPU 150 executes prescribed processes by reading prescribed computer programs P10 through P14, which will be described further below using FIG. 3. The local memory 160 is for providing a work area for the CPU 150.

The data controller 170 controls the transfer of data inside the controller 100. The CHAs 110, DKAs 120, cache memory 130, shared memory 140, and CPU 150 are coupled to one another via the data controller 170. In addition, the data controller 170 also controls the transfer of data between the one controller 100A and the other controller 100B.

The storage device 200, for example, is configured as a storage device that is capable of reading and writing data, such as a hard disk drive, a semiconductor memory drive, an optical disk drive, or a magneto-optical disk drive.

In a case where a hard disk drive is used as the storage device, for example, a FC (Fibre Channel) disk, a SCSI (Small Computer System Interface) disk, a SATA disk, an ATA (AT Attachment) disk, and a SAS (Serial Attached SCSI) disk can be used.

For example, a storage device such as a flash memory, a FeRAM (Ferroelectric Random Access Memory), a MRAM (Magnetoresistive Random Access Memory), an Ovonic Unified Memory, and a RRAM (Resistance RAM: registered trademark) can also be used as the storage device. In addition, for example, the configuration may also intermix different types of storage devices, such as a hard disk and a flash memory.

A RAID (Redundant Arrays of Inexpensive Disks) group 210 is created by grouping together either one or multiple storage devices 200. Either one or multiple logical volumes 220, which are logical storage devices, are created using a physical storage area that has been virtualized by the RAID group 210. A migration-source volume and a migration-destination volume are selected from among the multiple logical volumes 220.

A management terminal 30 is coupled to the respective controllers 100 via a communication network CN20, such as a LAN (Local Area network). The management terminal 30 acquires information with respect to various states of the storage system 10, and displays this information on a terminal screen. In addition, the management terminal 30 sends an instruction from the user to the storage system 10.

Figure 3:
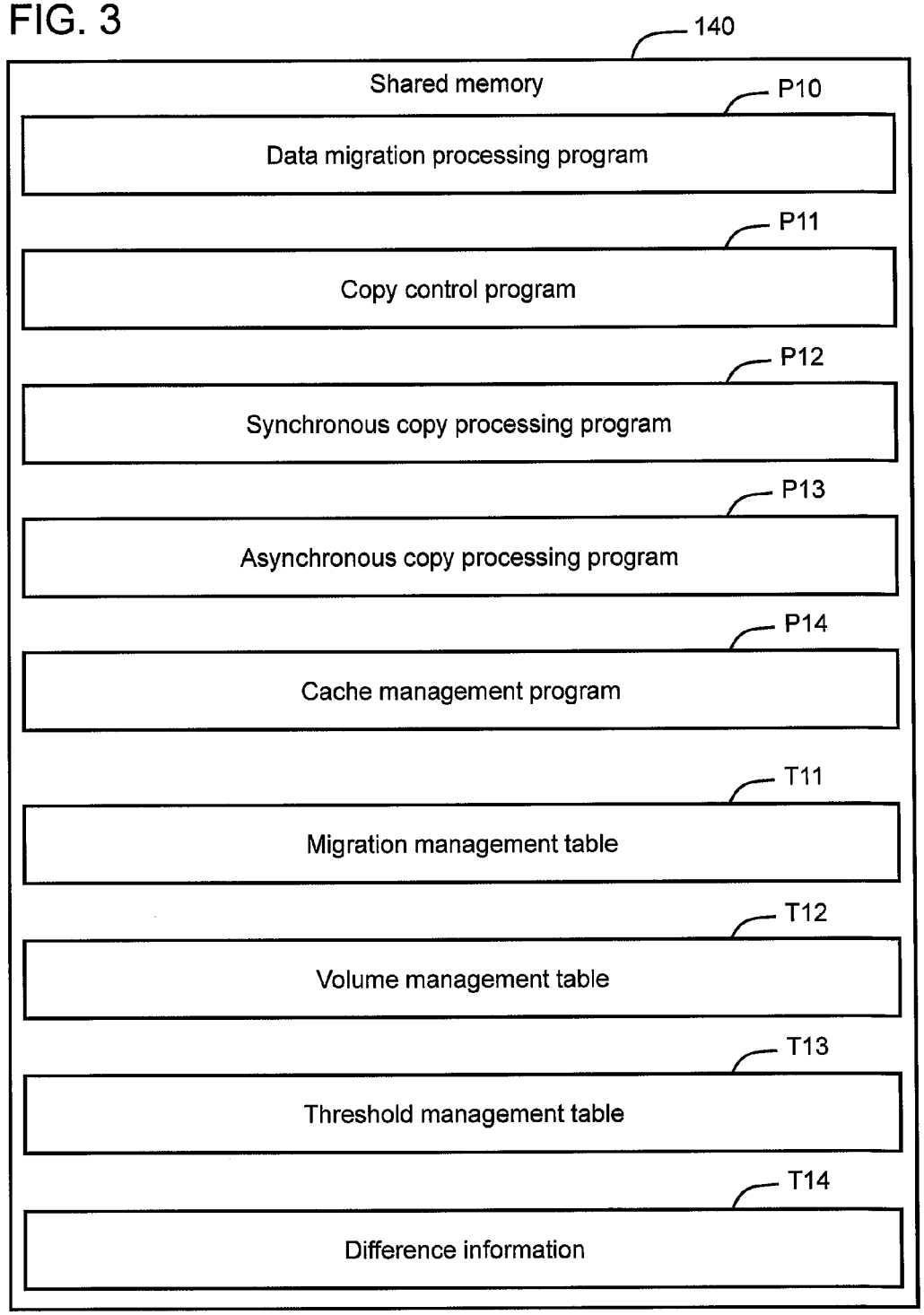
[FIG. 3]

FIG. 3 shows the storage contents of the shard memory 140. The shard memory 140, for example, is able to store multiple computer programs P10 through P14 and multiple management tables T11 through T14. Furthermore, the configuration may also be such that either a portion or all of these computer programs and management tables are stored in a storage area other that the shared memory 140 (for example, a storage device 200).

The data migration processing program P10 is a computer program for controlling a data migration from the migration-source volume to the migration-destination volume. The copy control program P11 is a computer program for controlling the processing method of a write command issued during data migration processing.

The synchronous copy processing program P12 is a computer program for controlling a synchronous copy process. The asynchronous copy processing program P13 is a computer program for controlling an asynchronous copy process.

The cache management program P14 is a computer program for managing the cache memory 130. The cache management program P14 executes a destaging process and the like.

The migration management table T11 is for managing information related to a data migration. A volume management table T12 is for managing the respective logical volumes 220 inside the storage system 10. A threshold management table T13 manages a threshold that is used by the copy control program P11. Furthermore, the threshold management table T13 is used in other examples, which will be described further below. Difference information T14 manages the progress of a data migration process.

Figure 4:
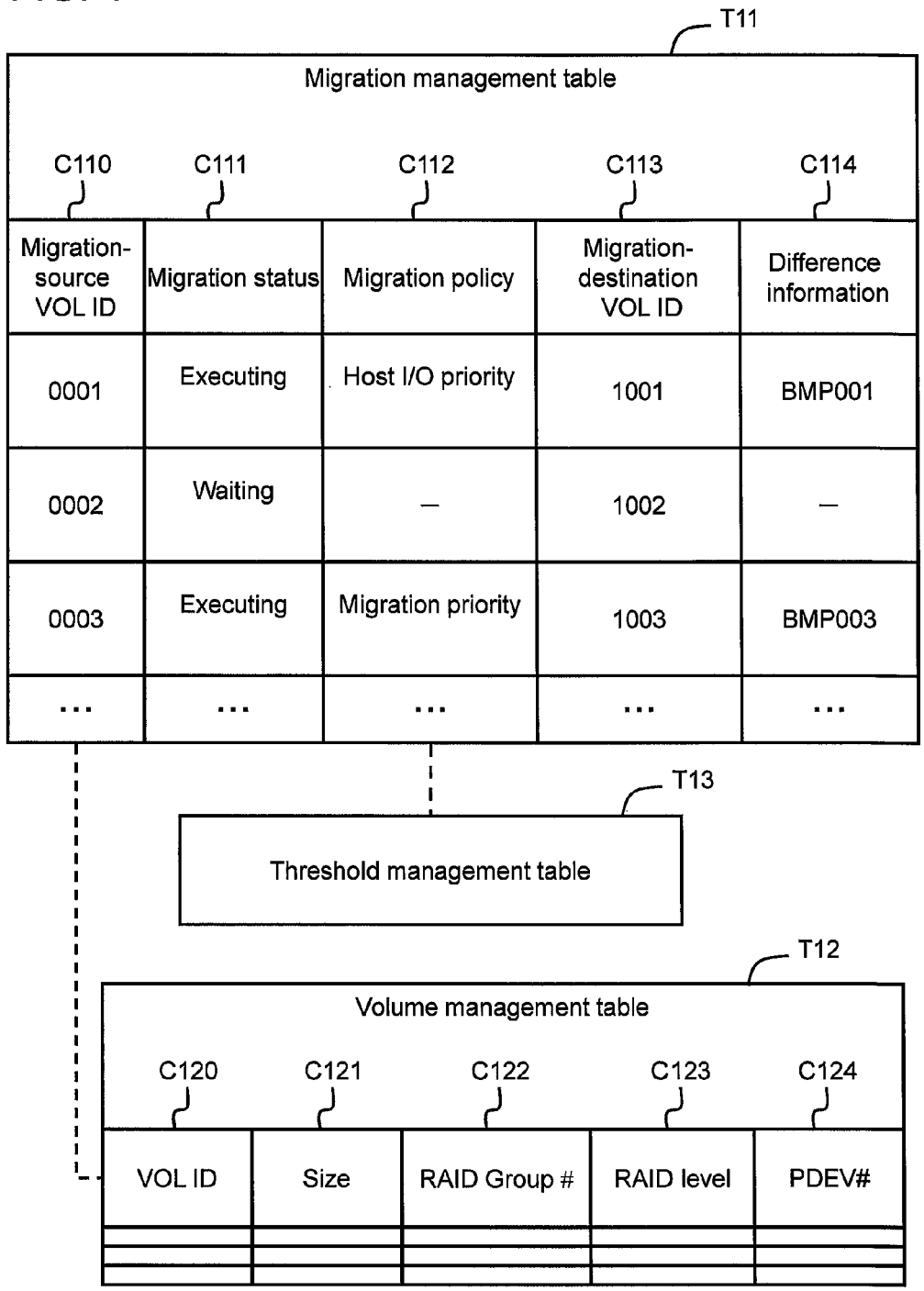
[FIG. 4]

FIG. 4 shows examples of the configurations of the respective management tables. The migration management table T11, for example, correspondingly manages a migration-source volume ID C110, a migration status C111, a migration policy C112, a migration-destination volume ID C113, and difference information C114.

The migration-source volume ID C110 stores information for identifying a migration-source volume. The migration status C111 stores information denoting the status of the data migration process. For example, "executing data migration" and "waiting for data migration" can be cited as migration statuses.

A policy, which is selected with respect to data migration processing, is stored in the migration policy C112. For example, a host I/O priority mode and a migration priority mode are prepared beforehand as the policies.

The host I/O priority mode processes on a priority basis a command from the host 20 during data migration processing. In a case where the host I/O priority mode has been selected, the asynchronous copy process, which can quickly respond to the host 20, is selected.

The migration priority mode places priority on the data migration process even when a command is issued from the host 20 during data migration processing. This is in order to promptly make the data of the migration-destination volume match with the data of the migration-source volume.

The migration-destination volume ID C113 stores information for identifying a migration-destination volume. The difference information C114 stores links (or pointers) for indicating difference information T14 (refer to FIG. 5). Items not shown in FIG. 4 may be managed in the migration management table T11.

The volume management table T12, for example, correspondingly manages a volume ID C120, a size C121, a RAID group number C122, a RAID level C123, and a storage device number C124. Furthermore, PDEV, which is the abbreviation for physical storage device, may be used to express a storage device 200 in the drawings.

The volume ID C120 stores information for identifying the respective logical volumes 220 inside the storage system 10. A volume ID, which has been selected from among the volume IDs as the migration-source volume, is stored in the column C110 of the migration management table T11 as the migration-source volume ID. Similarly, a volume ID, which has been selected from among the volume IDs as the migration-destination volume, is stored in the column C113 of the migration management table T11 as the migration-destination volume ID.

The size C121 stores the size of the logical volume 220. The RAID group number C122 stores information for identifying the RAID group 210 in which the logical volume 220 is disposed. The RAID level C123, for example, stores the RAID level of the RAID group 210 and the RAID configuration, such as "6D+2P (RAID6)" or "4D+1P (RAID5)". The storage device number C124 stores information for identifying a storage device 200 included in the RAID group 210. Furthermore, items other than those shown in FIG. 4, for example, a volume start address, a volume end address, a volume status, and other such items can also be managed using the volume management table T12.

The threshold management table T13 is used in another example, which will be explained further below, and, for example, manages an access threshold Th1 and/or a load threshold Th2.

Figure 5:
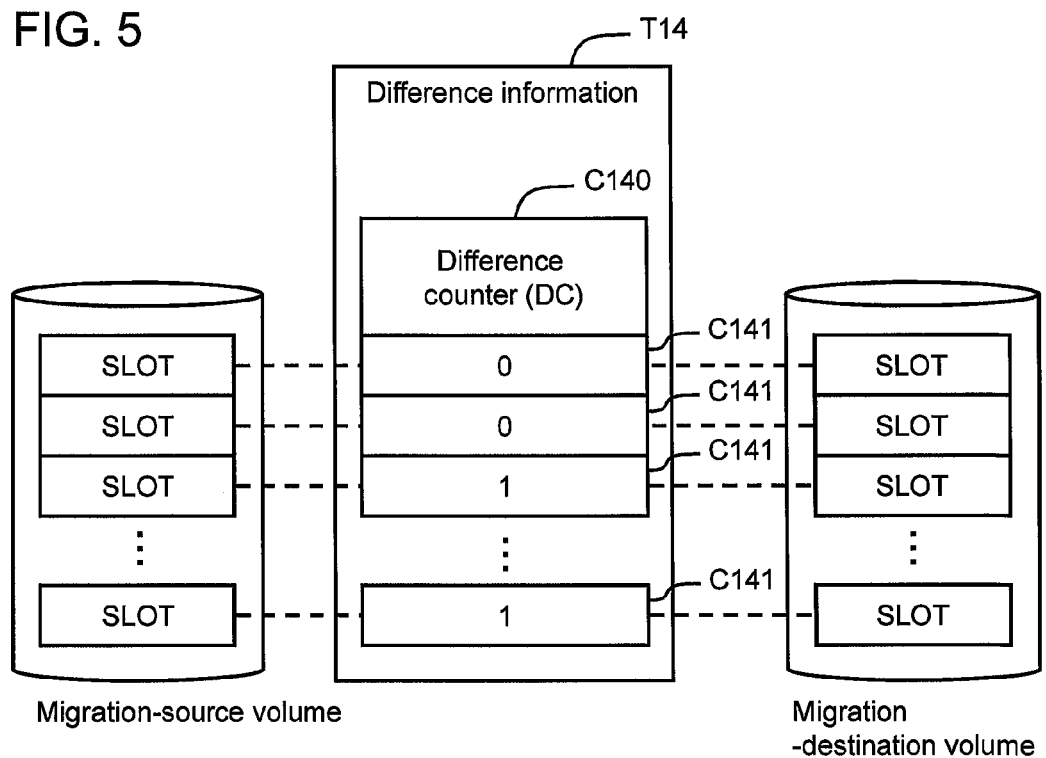
[FIG. 5]

FIG. 5 schematically shows the configuration of the difference information T14. The difference information T14 manages whether or not the migration-source volume data and the migration-destination volume data match up. The difference information T14, for example, comprises a difference counter C140 and a difference bit C141, which is prepared for each slot. Furthermore, for convenience sake, in a flowchart described further below, the difference information T14 will be explained by assigning the reference sign DC to the difference counter.

The storage spaces of the migration-source volume and the migration-destination volume are managed by being partitioned into areas of a prescribed size. A slot (or segment) will be given as an example of an area of a prescribed size. One slot is configured from a prescribed number of logical blocks, for example, either 96 or 116. The size of the logical block, for example, is either 512 bytes or 520 bytes.

For convenience of explanation, a migration-source volume slot will be called a migration-source slot, and a migration-destination volume slot will be called a migration-destination slot, and in a case where the data in the migration-source slot matches the data in the migration-destination slot corresponding to the migration-source slot, 0 bits are configured in the difference bits C141 corresponding to these slots. Alternatively, in a case where the data in the migration-source slot does not match the data in the migration-destination slot corresponding to the migration-source slot, 1 bits are configured in the difference bits C141 corresponding to these slots.

In a case where the host 20 writes data to a migration-source slot for which a data migration has been completed, a 1 bit is configured in the difference bit C141 corresponding to the slot in which this data is stored. When updated migration-source slot data is transferred to a migration-destination slot in accordance with either synchronous copy processing or asynchronous copy processing, the value of the difference bit C141 changes from a 1 bit to a 0 bit.

The difference counter C140 counts the total number of difference bits C141 for which the 1 bit is configured. Because the 1 bit is configured in all of the difference bits C141 in the initial state, the initial value of the difference counter C140 is equivalent to the total number of slots. As data migration processing progresses, the values of the difference bits C141 change from the 1 bit to the 0 bit, reducing the value of the difference counter C140. When data migration processing is complete and the data of the migration-destination volume matches the data of the migration-source volume, 0 bits are configured in all of the difference bits C141. The value of the difference counter C140 becomes 0 at this time.

Figure 6:
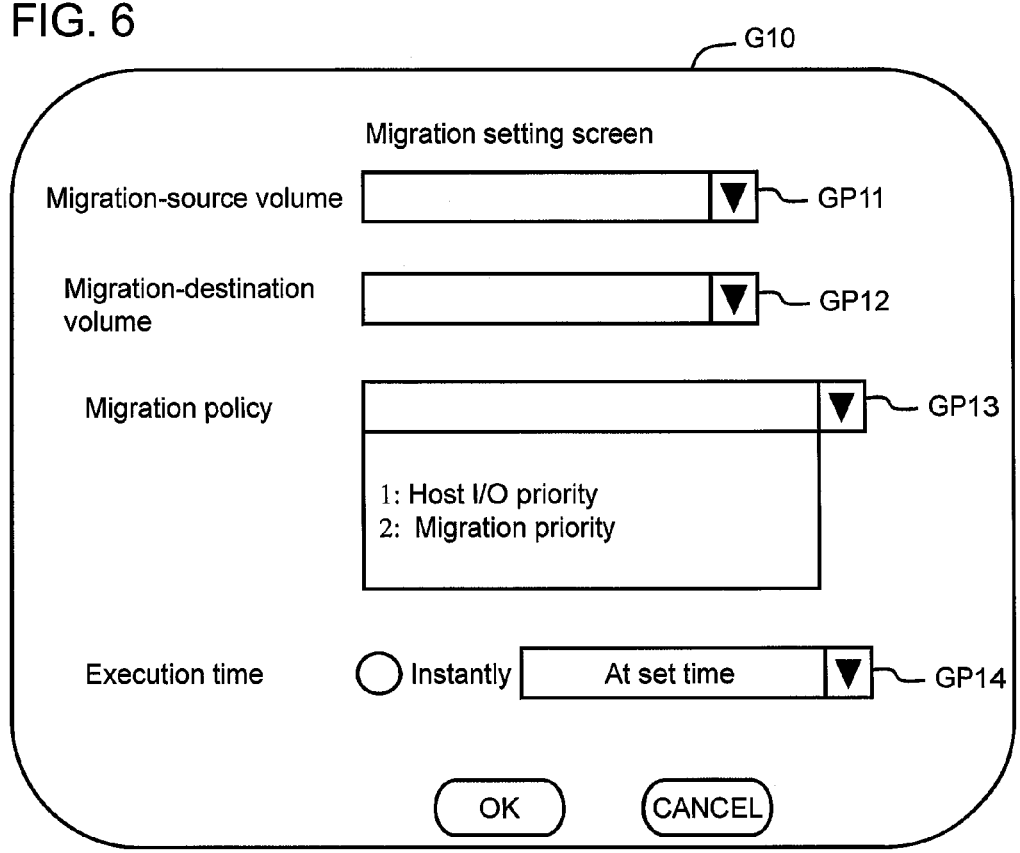
[FIG. 6]

FIG. 6 shows a screen G10 for configuring information related to data migration processing. The migration setting screen G10, for example, is provided to the user from the management terminal 30. The user configures values related to data migration processing via the migration setting screen G10.

The migration setting screen G10, for example, comprises a migration-source volume specification part GP11, a migration-destination volume specification part GP12, a migration policy specification part GP13, and an execution time specification part GP14.

The migration-source volume specification part GP11 is for specifying the logical volume 220 to be the migration source of the data migration process (the migration-source volume). The migration-destination volume specification part GP12 is for specifying the migration-destination volume.

The migration policy specification part GP13 is for specifying a migration policy. The execution time specification part GP14 is for specifying the time for executing data migration processing. The execution time can be specified so as to carry out execution instantly, or can be specified so as to carry out execution at a time that was inputted.

Figure 7:
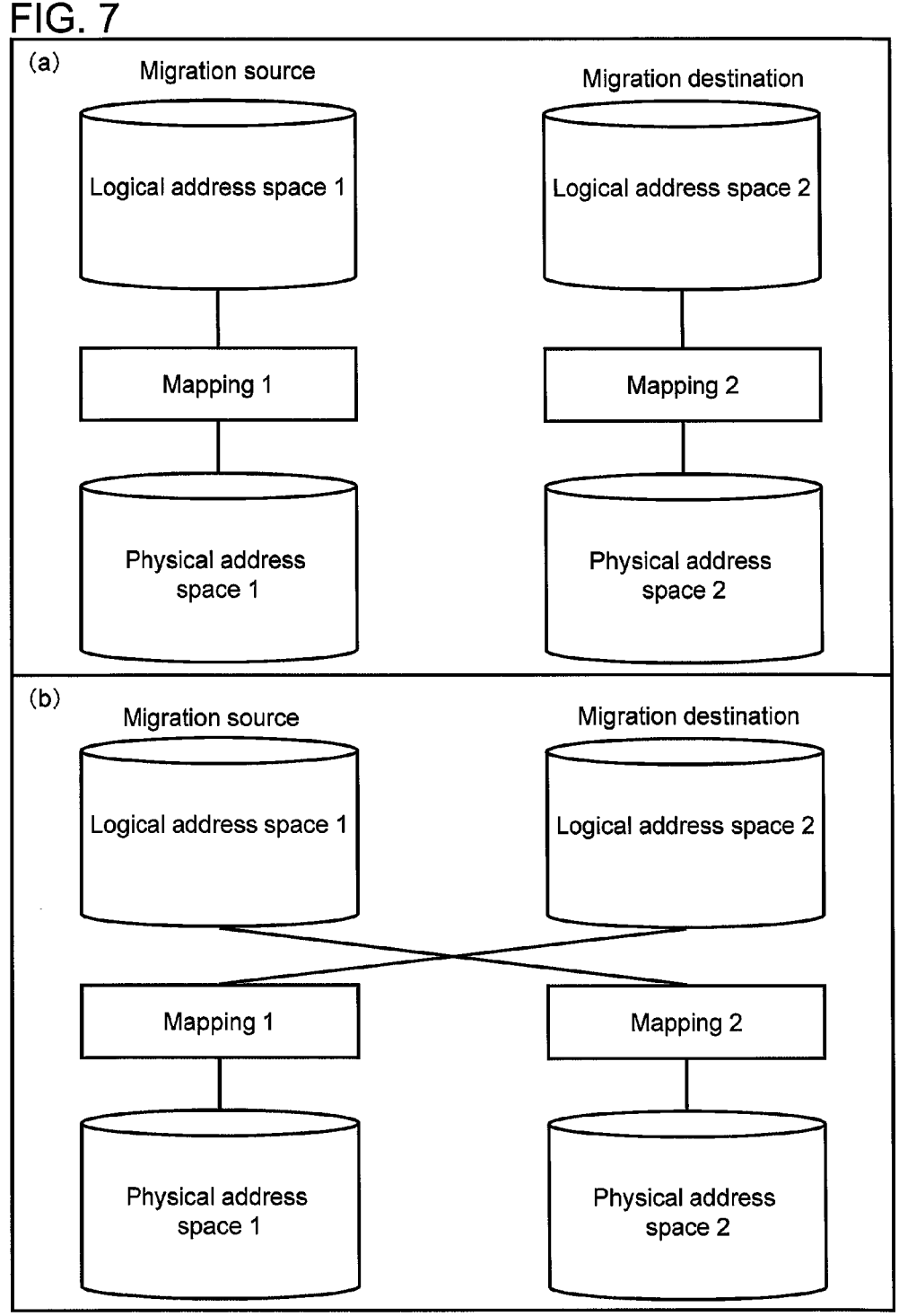
[FIG. 7]
Figure 8:
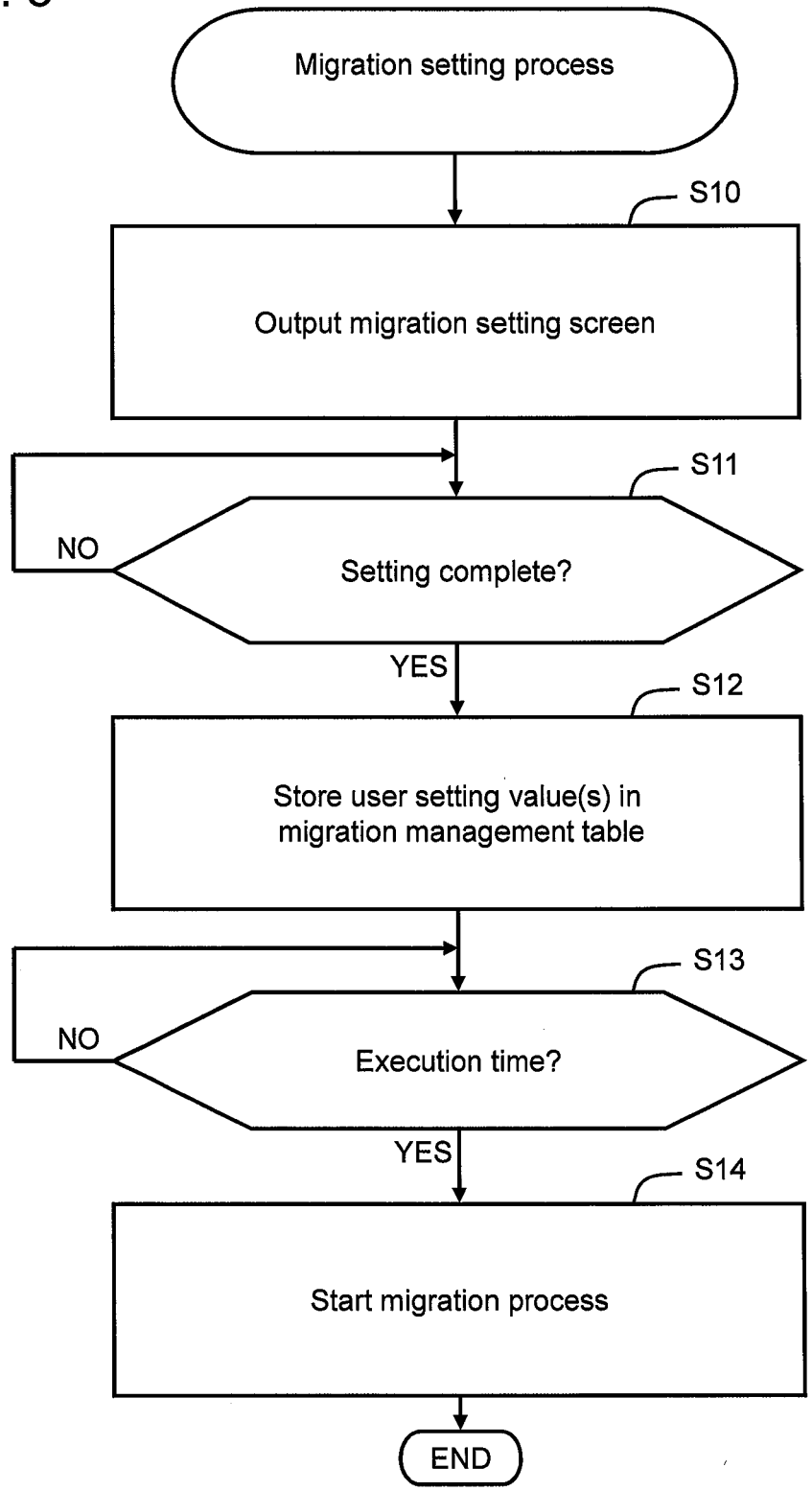
[FIG. 8]

FIG. 7 shows how mapping is processed during data migration processing. FIG. 7(a) shows the status prior to starting data migration processing. FIG. 7(b) shows the status subsequent to completing data migration processing.

As shown in FIG. 7(a), the migration-source volume is configured by associating a logical address space 1 with a physical address space 1. Similarly, the migration-destination volume is configured by associating a logical address space 2 with a physical address space 2.

The host 20 issues either a write command or a read command specifying a logical address of a logical volume. The DKA 120 translates the specified logical address to a physical address using mapping information. The DKA 120 carries out RAID processing based on the RAID level and the RAID configuration. The DKA 120 reads/writes the data from/to the storage device 200 in accordance with the physical address.

When the data migration processing starts, data inside the physical address space 1 of the migration-source volume is transferred and copied to the physical address space 2 of the migration-destination volume. When the data migration processing is complete, as shown in FIG. 7(b), the mapping information is switched between the migration-source volume and the migration-destination volume.

That is, the logical address space 1 of the migration-source volume is mapped to the physical address space 2 by way of the mapping information 2. Similarly, the logical address space 2 of the migration-destination volume is mapped to the physical address space 1 by way of the mapping information 1. The migration-source volume data can be migrated to the storage device 200 faster (or slower) by carrying out a mapping information switching process like this.

The operations of the storage system 10 will be explained by referring to FIGS. 8 through 12. The respective processes described hereinbelow are realized by the CPU 150 of the controller 100 reading and executing prescribed computer programs. Therefore, any of the storage system 10, controller 100, CPU 150, and computer program may have primary responsibility for the operations. Furthermore, the flowcharts shown in the drawings are examples, and the present invention is not limited to the flowcharts of the drawings. A so-called person with ordinary skill in the art should be able to change a portion of the steps cited in the drawings, rearrange the sequence of these steps, or add a new step.

The controller 100 outputs the migration setting screen G10 to the screen of the management terminal 30 in accordance with a user request (S10). The user uses the displayed migration setting screen G10 to configure a migration-source volume, a migration-destination volume, a migration policy, and so forth. When the settings are complete, the user operates an OK button on the migration setting screen G10.

The controller 100 determines whether the user setting operation has been completed (S11). In a case where the setting operation is complete (S11: YES), the controller 100 stores the information configured by the user in the migration management table T11 (S12). When the time configured by the user arrives (S13: YES), the controller 100 starts the data migration processing program P10 (S14).

Figure 9:
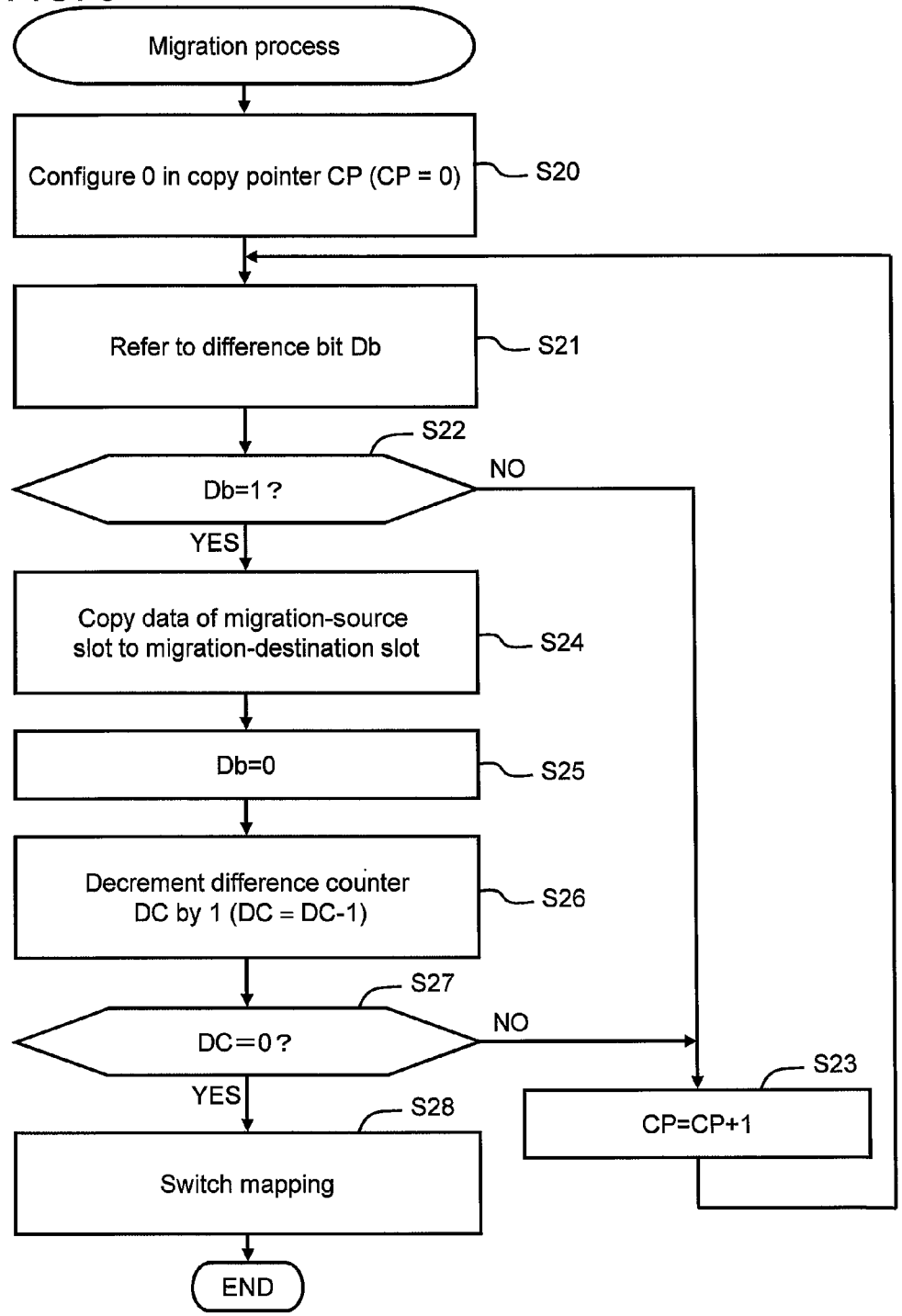
[FIG. 9]

FIG. 9 is a flowchart showing a data migration process. The controller 100 configures 0 as the initial value of a copy pointer CP (S20). The copy pointer CP manages the number of the slot to which data from the migration-source volume is to be copied to the migration-destination volume.

The controller 100 refers to a difference bit Db that corresponds to the slot (copy-target slot) to which the copy pointer CP is pointing (S21). The controller 100 determines whether the difference bit Db corresponding to the copy-target slot is configured to 1 (S22).

In a case where the difference bit Db is configured to 0 (S22: NO), the data in the migration-source slot, which is the copy target, matches the data in the migration-destination slot corresponding to this migration-source slot. Therefore, the controller 100 increments the value of the copy pointer CP by 1 (S23) and returns to S21.

In a case where the difference bit Db is configured to 1 (S22: YES), the migration-source slot data and the migration-destination slot data do not match. The controller 100 copies the migration-source slot data to the migration-destination slot (S24). The controller 100 changes the value of the difference bit Db corresponding to the slot for which the data copy was completed to 0 (S25).

The controller 100 decrements the value of the difference counter DC by 1 (S26). This is because data migration has been completed for one slot.

The controller 100 determines whether the value of the difference counter DC is 0 (S27). In a case where the value of the difference counter DC is 0 (S27: YES), the data migration processing is complete and the migration-source volume data and the migration-destination volume data are a match.

Consequently, the controller 100, as was explained using FIG. 7, switches the mapping information between the migration-source volume and the migration-destination volume (S28), and ends this processing. That is, the logical address space of the migration-source volume and the physical address space of the migration-destination volume are associated, and the logical address space of the migration-destination volume and the physical address space of the migration-source volume are associated.

In a case where the value of the difference counter DC is not 0 (S27: NO), data to be copied from the migration-source volume to the migration-destination volume still remains, and the data migration processing is not complete. Consequently, the controller 100 increments the copy pointer CP by 1 (S23) and returns to S21.

Figure 10:
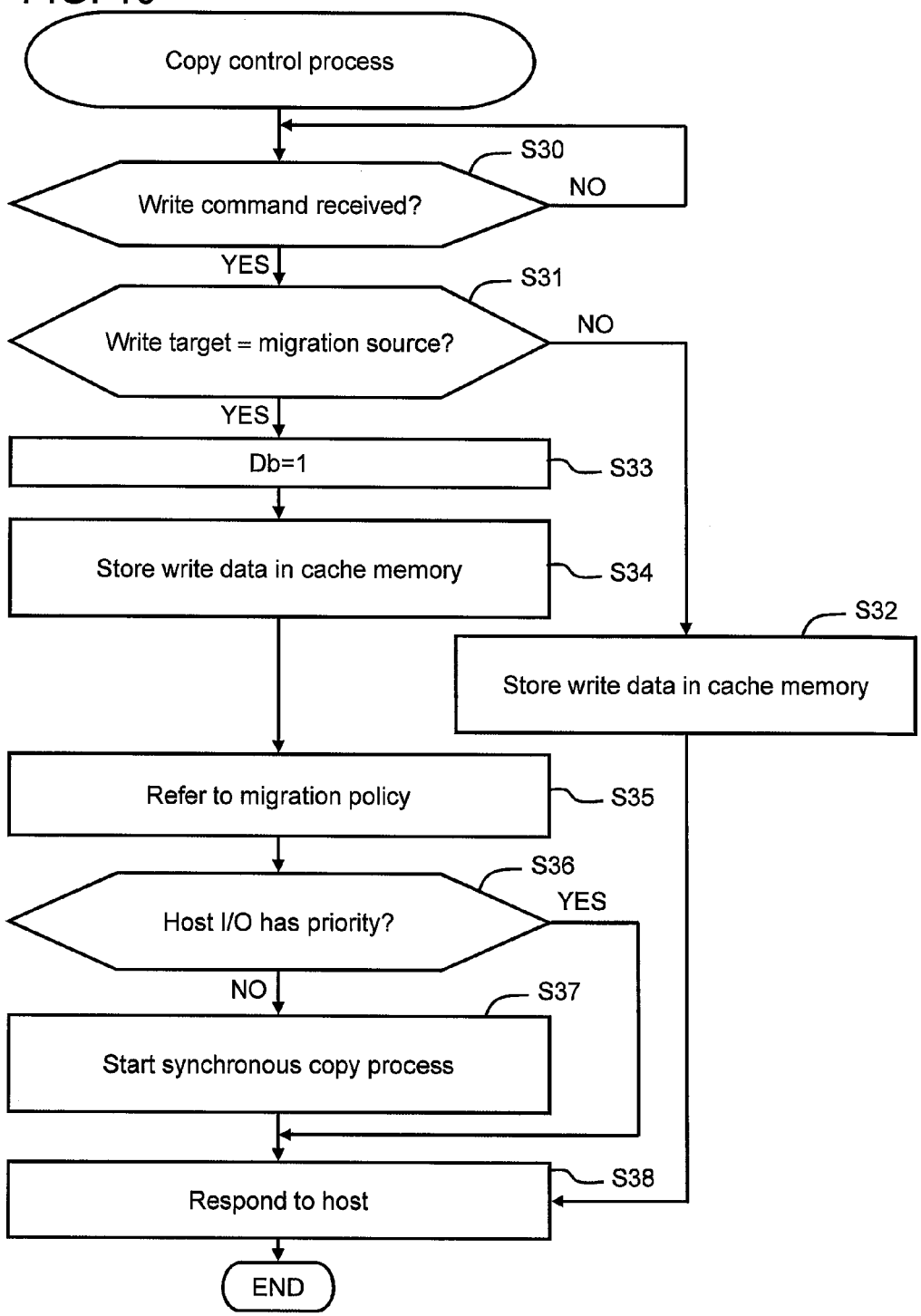
[FIG. 10]

FIG. 10 is a flowchart of a copy control process. This process processes a write command issued by the host 20 during data migration processing.

The controller 100 determines whether a write command has been received from the host 20 (S30). In a case where a write command has been received (S30: YES), the controller 100 refers to the migration management table T11, and determines whether the target volume of the write command is the migration-source volume of the data migration processing (S31).

For example, in a case where the ID of the logical volume specified in the write command is registered in the migration-source volume ID C110 of the migration management table T11, the controller 100 is able to determine that the write-target volume is the migration-source volume.

In a case where the write-target volume is not the migration-source volume (S31: NO), the controller 100 carries out processing the same as for an ordinary write process. That is, the controller 100 stores the write data received from the host 20 in the cache memory 130 (S32), and thereafter, notifies the host 20 to the effect that write command processing is complete (S38). The controller 100 processes the completion response to the host 20 and the data write to the storage device 200 in the asynchronous mode.

In a case where the write-target volume and the migration-source volume match (S31: YES), the controller 100 configures the value of the difference bit(s) Db corresponding to the slot(s) comprising the write range to 1 (S33). Regardless of whether the data migration processing is complete or not, the controller 100 configures the values of the difference bit(s) Db corresponding to the write range to 1.

The controller 100, after storing the write data received from the host 20 in the cache memory 130 (S34), refers to the migration policy C112 of the migration management table T11 (S35).

The controller 100 determines whether the migration policy configured in the write-target migration-source volume is "host I/O priority mode" (S36). In a case where the migration policy configured in the migration-source volume is not the host I/O priority mode (S36: NO), the data migration priority mode has been selected as the migration policy.

Consequently, the controller 100 start the synchronous copy processing program P12 and executes a synchronous copy process (S37). The synchronous copy process will be explained in detail using FIG. 11. The controller 100 notifies the host 20 to the effect that write command processing is complete subsequent to the completion of the synchronous copy processing (S38).

Figure 11:
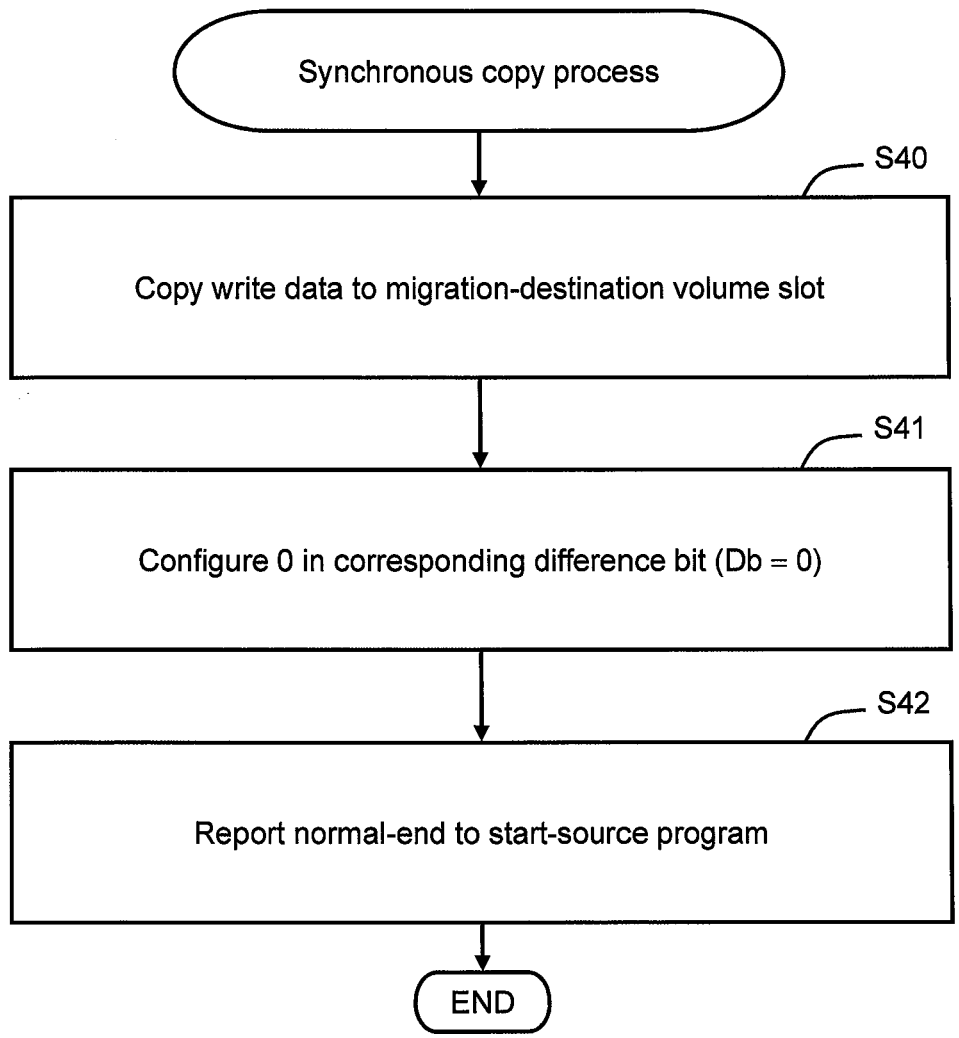
[FIG. 11]

FIG. 11 is a flowchart of the synchronous copy process. The synchronous copy processing program P12 copies the write data to the slot of the migration-destination volume (S40), and configures the value of the difference bit Db corresponding to this slot to 0 (S41). The synchronous copy processing program P12 notifies the copy control program P11, which is the start-source of the synchronous copy processing program P12, to the effect that synchronous copying has ended normally (S42).

Figure 12:
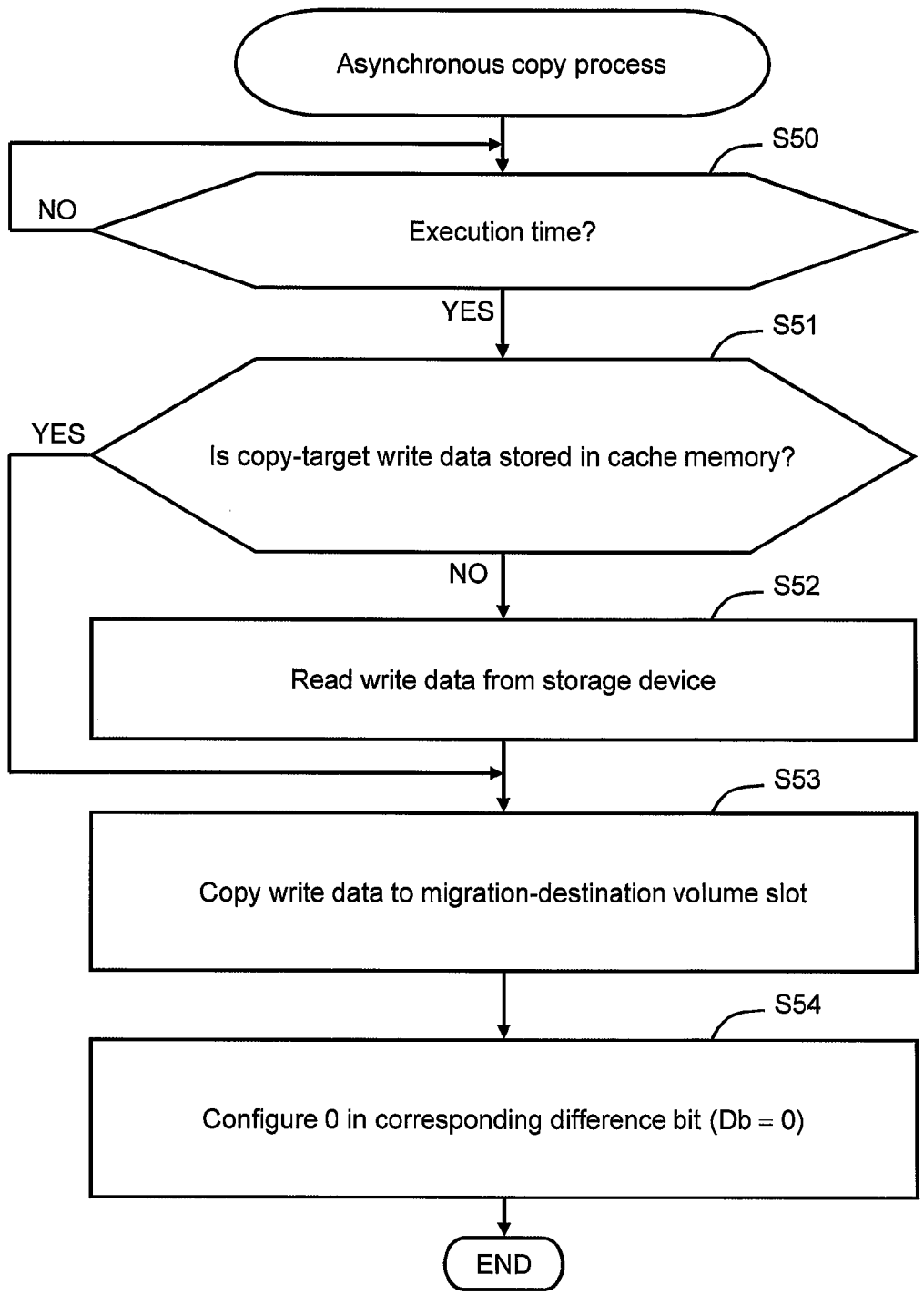
[FIG. 12]

FIG. 12 is a flowchart of the asynchronous copy process. The asynchronous copy processing program P13 determines whether or not it is the execution time (S50). For example, in a case where either the free capacity of the cache memory 130 is equal to or less than a prescribed value or the controller load is equal to or less than a prescribed value, the asynchronous copy processing program P13 is able to determine that asynchronous copy processing execution time has arrived.

When the copy execution time has arrived (S50: YES), the asynchronous copy processing program P13 determines whether the copy-target write data is stored in the cache memory 130 (S51). Since a destaging process is carried out by the cache management program P14, there is the likelihood that the write data that was written to the storage device 200 has disappeared from the cache memory 130.

In a case where the copy-target write data is not stored in the cache memory 130 (S51: NO), the asynchronous copy processing program P13 transfers the copy-target write data from the storage device 200 to the cache memory 130 (S52). In a case where the copy-target write data is stored in the cache memory 130 (S51: YES), the asynchronous copy processing program P13 skips Step S52 and proceeds to S53.

The asynchronous copy processing program P13 copies the copy-target write data to a slot of the migration-destination volume (S53), and configures the value of the difference bit Db corresponding to the slot for which the copy has been completed to 0 (S54).

Configuring this example like this makes it possible for the user to specify a migration policy beforehand for each volume pair that is to be the target of data migration processing. Therefore, the user is able to configure a suitable migration policy for each of multiple pairs of migration-source volumes and migration-destination volumes in the storage system 10.

Therefore, in this example, data migration processing that conforms to the actual state of the storage system can be realized, and data migration processing can be completed relatively promptly without suspending a write access from the host 20. This enhances user usability.

EXAMPLE 2

Example 2 will be explained by referring to FIG. 13. Each of the following examples, to include this example, is equivalent to a variation of Example 1. Consequently, the following explanations will focus on the differences with Example 1. In this example, one of either the synchronous copy process or the asynchronous copy process is selected based on the number of write accesses NW to the migration-source volume per unit of time.

Figure 13:
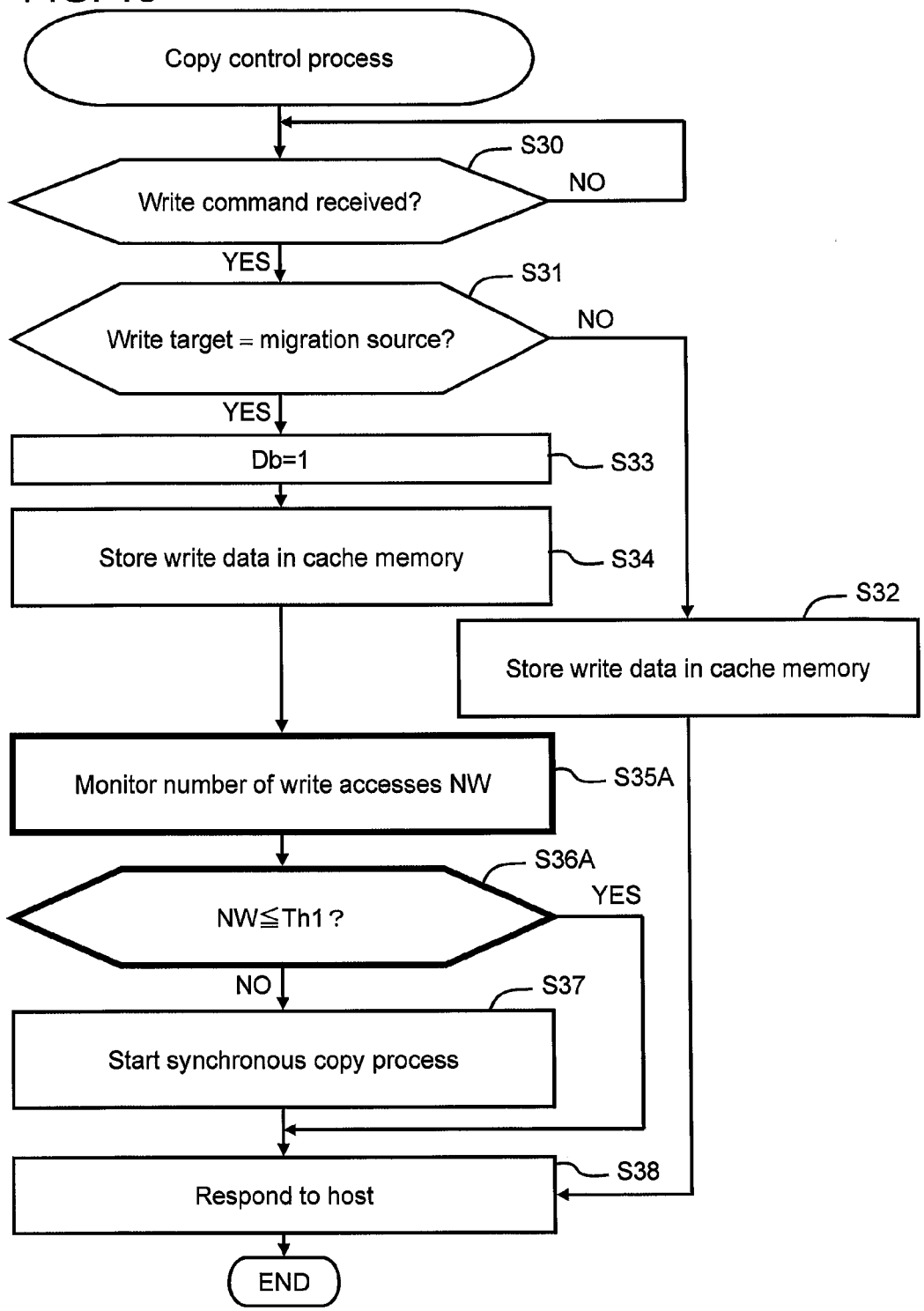
[FIG. 13]

FIG. 13 is a flowchart of a copy control process according to this example. S30 through S34 are the same as was explained using FIG. 10, and as such explanations thereof will be omitted.

The controller 100, in a case where a write command with respect to the migration-source volume has been received, monitors the number of write accesses NW by the host 20 to the migration-source volume per unit of time (S35A).

The controller 100 determines whether the number of write accesses NW per unit of time is equal to or less than a prescribed access threshold Th1 (S36A). In a case where the number of write accesses NW per unit of time is equal to or less than the prescribed access threshold Th1 (S36A: YES), the controller 100 returns a response to the host 20 (S38) and ends this processing. In accordance with this, the asynchronous copy processing described using FIG. 12 is executed at the prescribed time.

In a case where the number of write accesses NW per unit of time is larger than the prescribed access threshold Th1 (S36A: NO), the controller 100 starts the synchronous copy processing program P12 (S37). After the synchronous copy processing is complete, the controller 100 responds to the host 20 to the effect that write command processing is complete (S38).

The access threshold Th1, for example, is decided based on the data copying speed from the migration-source volume to the migration-destination volume. An average value of copying speeds may be used as the threshold Th1. Since the copying speed is fast in a case where the number of write accesses NW to the migration-source volume is equal to or less than the access threshold Th1, there is no problem whatsoever in executing the asynchronous copy process. Consequently, asynchronous copy processing, which can shorten the response time to the host 20, is selected.

Alternatively, when the asynchronous copy process is executed in a case where the number of write accesses NW to the migration-source volume exceeds the access threshold Th1, uncopied write data rapidly accumulates in the cache memory 130. When the free capacity of the cache memory 130 dwindles, a destaging process in executed and uncopied write data is written to the storage device 200. In a case where the write data is to be transferred and written from the migration-source volume to the migration-destination volume, the data must be read from the storage device 200, requiring that much more time. Consequently, the synchronous copy process is selected in a case where the number of write accesses NW to the migration-source volume exceeds the access threshold Th1.

Configuring this example like this achieves the same effects as Example 1. In addition, in this example, one of either the synchronous copy process or the asynchronous copy process can be selected each time a write command is received from the host 20. This makes it possible to select the appropriate copy process in accordance with the frequency of write accesses for each pair of a migration-source volume and a migration-destination volume in accordance with the actual state of the storage system 10 (the controller load and extent of communication congestion), thereby enhancing usability.

EXAMPLE 3

Figure 14:
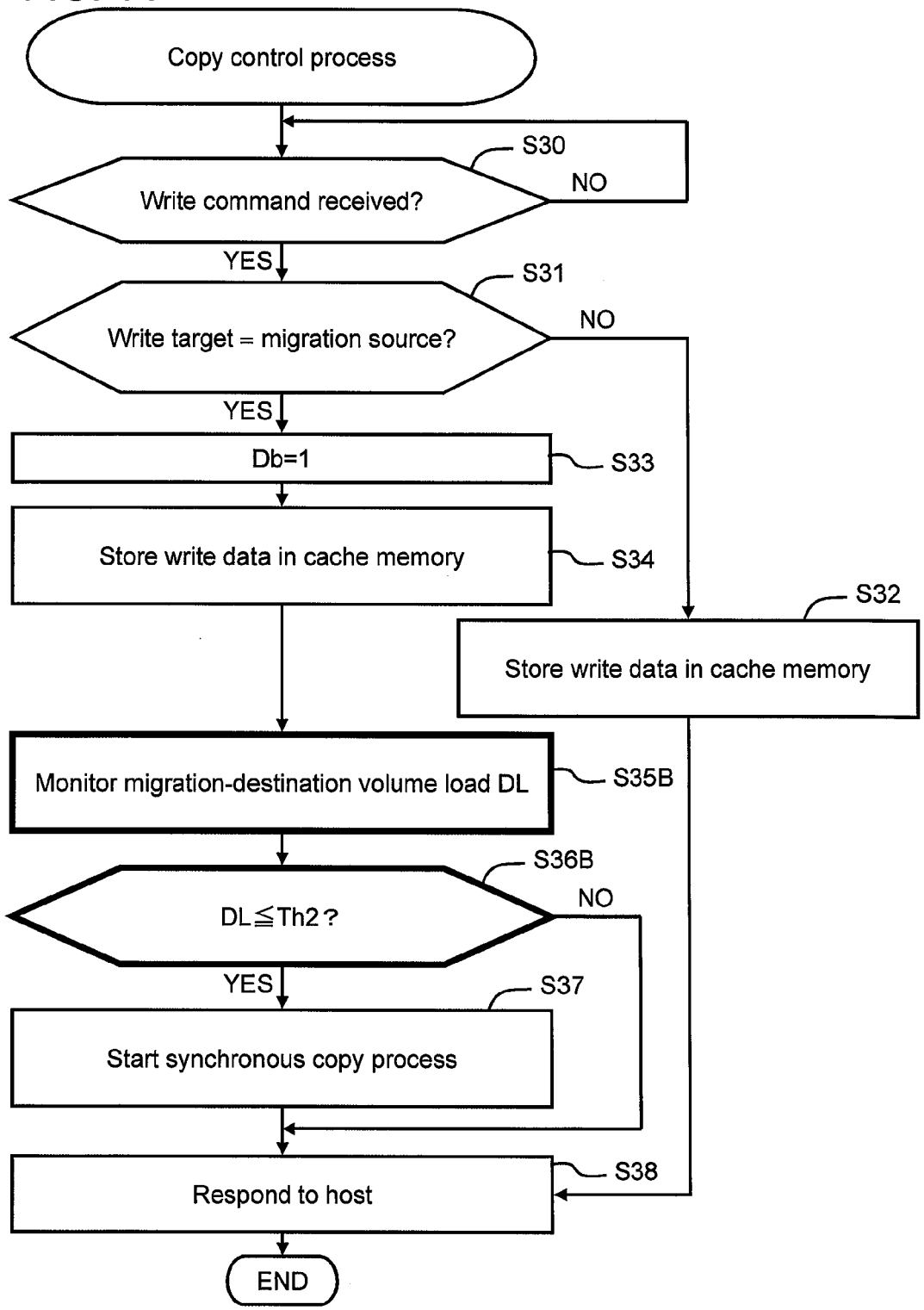
[FIG. 14]

Example 3 will be explained be referring to FIG. 14. In this example, one of either the synchronous copy process or the asynchronous copy process is selected in accordance with the load on the migration-destination volume. FIG. 14 shows a copy control process of this example. The explanation will focus on the differences with Example 1.

The controller 100 monitors the migration-destination volume load DL (S35B), and determines whether the load DL is equal to or less than a prescribed load threshold Th2 (S36B). In a case where the migration-source volume load DL is equal to or less than the prescribed load threshold Th2 (S36B: YES), the controller 100 starts the synchronous copy processing program P12 (S37). After the synchronous copy process has been completed, the controller 100 responds to the host 20 to the effect that write command processing is complete (S38).

Alternatively, in a case where the migration-destination volume load DL exceeds the prescribed load threshold Th2 (S36B: NO), the controller 100 responds to the host 20 to the effect that write command processing is complete (S38). That is, in this case, the asynchronous copy process is selected.

As shown in FIG. 2, multiple logical volumes 220 can be disposed in a RAID group 210. A case will be explained in which one logical volume 220 of the multiple logical volumes 220 that belong to the same RAID group 210 is selected as the migration-destination volume for data migration processing, and the other logical volume is accessed frequently from another host 20.

In accordance with this, since the access frequency to the other logical volume 220 is high, the destaging process for the migration-destination volume does not progress. Therefore, data that is not written to the migration-destination volume piles up in the cache memory area corresponding to the migration-destination volume of the storage areas in the cache memory 130.

Therefore, when synchronous copy processing is executed in a case like this, it takes time for a response from the migration-destination volume, and the response performance of the storage system 10 declines. Consequently, in a case where the migration-destination volume load DL (specifically, the load on the storage device 200 corresponding to the migration-destination volume) exceeds the load threshold Th2, the asynchronous copy process is selected. Space can be expected to be freed up in the cache memory area corresponding to the migration-destination volume while the write data from the host 20 is being stored in the cache memory area corresponding to the migration-source volume.

Since there is no particular problem with selecting the synchronous copy process in a case where the migration-destination volume load DL is equal to or less than the load threshold Th2, the synchronous copy process is selected. Configuring this example like this achieves the same effects as each of the above-mentioned examples.

EXAMPLE 4

Figure 15:
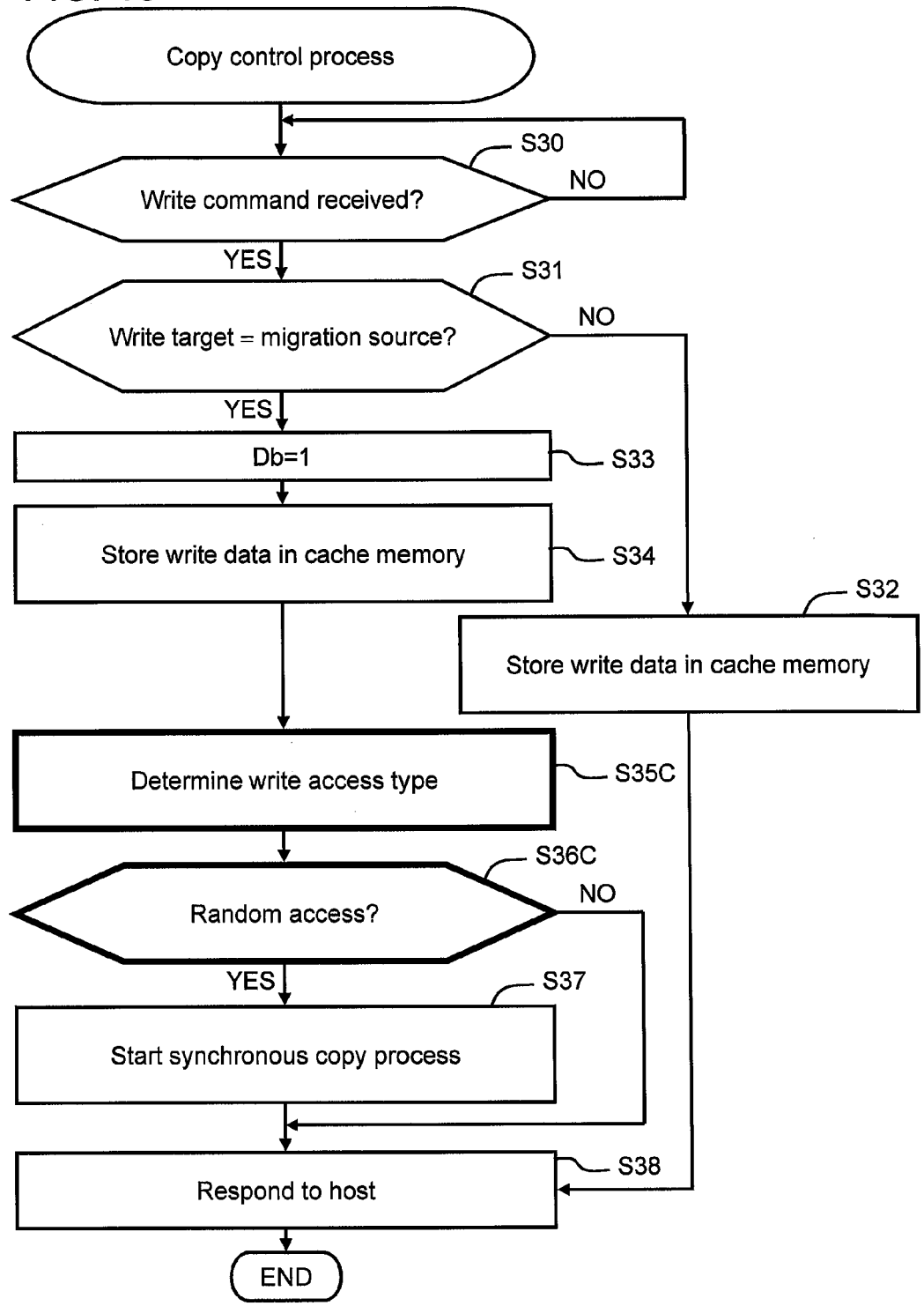
[FIG. 15]

Example 4 will be explained by referring to FIG. 15. In this example, one of either the synchronous copy process or the asynchronous copy process is selected based on the type of write access to the migration-source volume. FIG. 15 is a flowchart showing a copy control process of this example.

The controller 100 determines the type of write access to the migration-source volume (S35C). The types of write access include sequential access and random access. In the case of sequential access, write data is written to successive logical blocks inside the same slot. In the case of random access, the write data is written to non-successive logical blocks in different slots.

The controller 100 determines whether a write access to the migration-source volume is a random access (S36C). In the case of a random access (S36C: YES), the controller 100 starts the synchronous copy processing program P12 (S37). The controller 100 responds to the host 20 to the effect that write command processing is complete after synchronous copy processing has been completed (S38).

Alternatively, in a case where the write access to the migration-source volume is a sequential access (S36C: NO), the controller 100 responds to the host 20 to the effect that write command processing is complete (S38). In other words, in this case, the controller 100 selects the asynchronous copy process.

When the synchronous copy process is selected in a case where the migration-source volume is being accessed sequentially, it is not possible to make the most of the characteristic feature of sequential access, i.e. the writing of data to successive multiple areas. This is because a response to the effect that writing is complete must be issued to the migration-source volume each time write data is written. Therefore, in the case of sequential access, the controller 100 selects the asynchronous copy process and stores the data successively written from the host 20 in the cache memory area corresponding to the migration-source volume. This makes it possible for the controller 100 to rapidly respond to the host 20 to the effect that write command processing is complete.

In the case of random access, the write data is written to dispersed storage areas. Therefore, there is no particular problem with notifying write-complete from the migration-destination volume side to the migration-source volume side each time there is a write. Consequently, in the case of random access, the controller 100 selects the synchronous copy process. Configuring this example like this achieves the same effects as each of the above-mentioned examples.

EXAMPLE 5

Example 5 will be explained by referring to FIGS. 16 and 17. In this example, Examples 1 through 4 are integrated into a single example.

Figure 16:
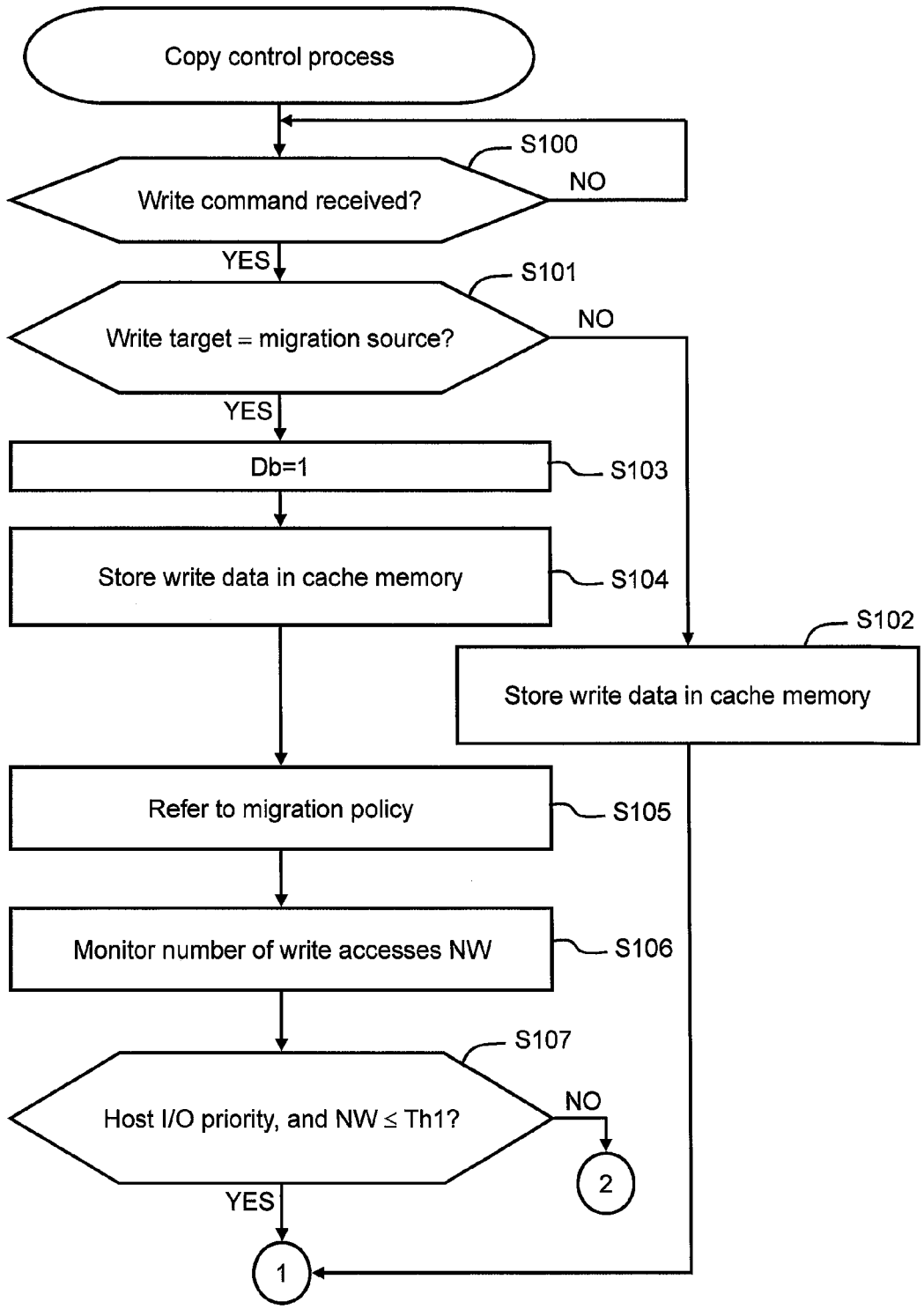
[FIG. 16]
Figure 17:
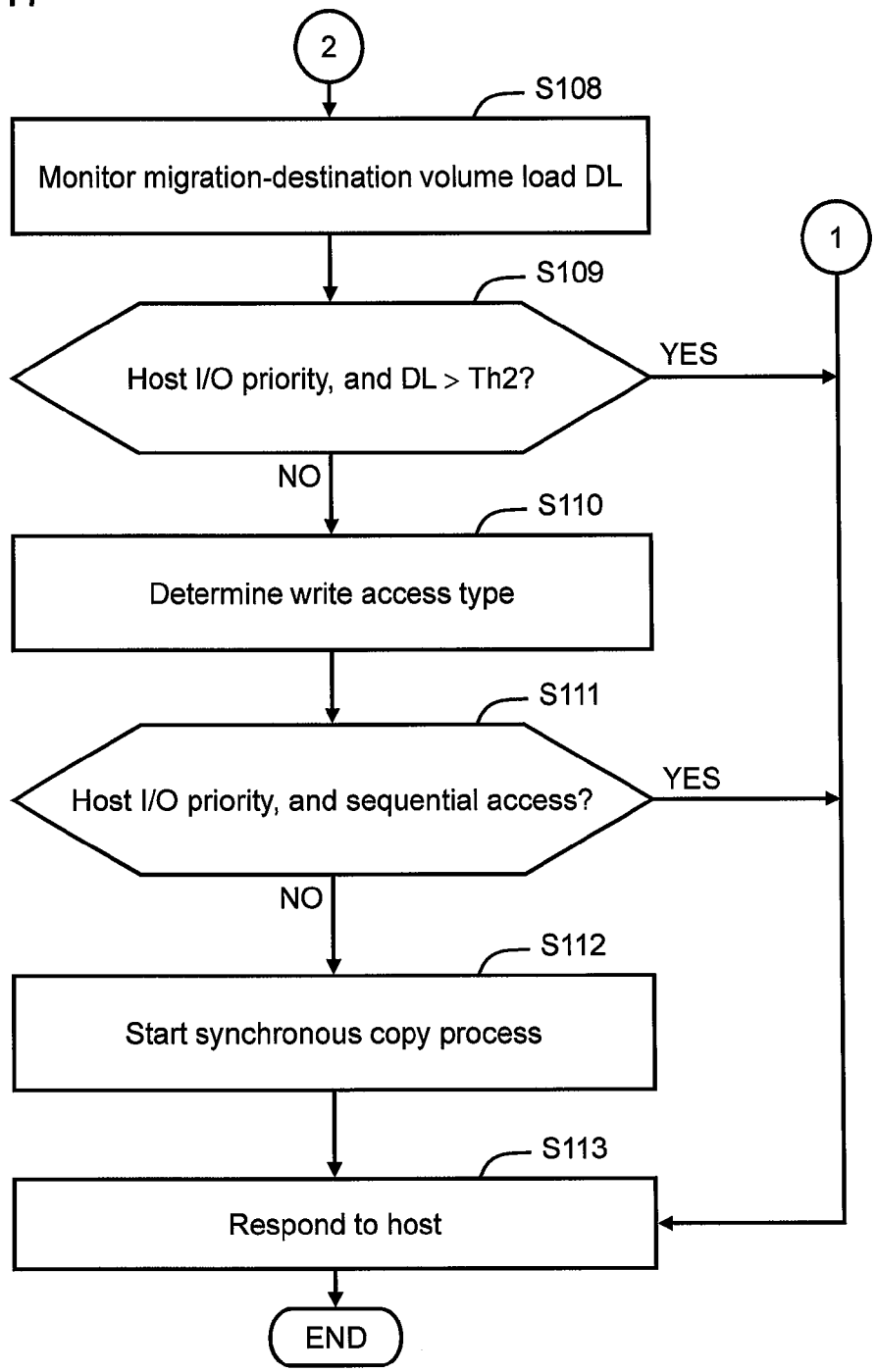
[FIG. 17]

FIGS. 16 and 17 are flowcharts of a copy control process according to this example. The controller 100, upon receiving a write command from the host 20 (S100: YES), determines whether the write-target volume is the migration-source volume of the data migration processing (S101).

In a case where the write command is not for the migration-source volume (S101: NO), the controller 100 stores the write data in the cache memory 130 (S102) and proceeds to FIG. 17 by way of a connector 1. The controller 100 responds to the host 20 to the effect that the write command processing is complete (S113).

In a case where the write command from the host 20 is targeted at the migration-source volume (S101: YES), the controller 100 configures 1 in the value of the difference bit(s) Db corresponding to the write-range slot(s) (S103).

The controller 100, after storing the write data in the cache memory 130 (S104), refers to the migration policy configured for the migration-source volume (S105). In addition, the controller 100 monitors the number of write accesses to the migration-source volume per unit of time (S106).

The controller 100 determines whether the migration policy is configured to the host I/O priority mode, and, in addition, whether the number of write accesses NW to the migration-source volume per unit of time is equal to or less than the prescribed access threshold Th1 (S107).

In a case where the migration policy is configured to the host I/O priority mode, and, in addition, the number of write accesses NW is equal to or less than the threshold Th1 (S107: YES), the controller 100 moves to FIG. 17 by way of the connector 1, and responds to the host 20 (S113). That is, in this case, the asynchronous copy process is selected.

In a case where either the migration policy is not configured to the host I/O priority mode, or the number of write accesses NW to the migration-source volume per unit of time exceeds the access threshold Th1 (S107: NO), the controller 100 moves to the flowchart of FIG. 17 by way of a connector 2.

The controller 100 monitors the migration-destination volume load DL (S108). The controller 100 determines whether the migration policy is configured to the host I/O priority mode, and, in addition, whether the migration-destination volume load DL exceeds the prescribed load threshold Th2 (S109).

In a case where the migration policy is configured to the host I/O priority mode, and, in addition, the migration-destination volume load DL exceeds the prescribed load threshold Th2 (S109: YES), the controller 100 responds to the host 20 to the effect that the write command processing is complete (S113). That is, in this case, the asynchronous copy process is selected.

In a case where either the migration policy is not configured to the host I/O priority mode, or the migration-destination volume load DL is equal to or less than the load threshold Th2 (S109: NO), the controller 100 determines the type of write access (S110).

The controller 100 determines whether the migration policy is configured to the host I/O priority mode, and, in addition, whether the type of write access is sequential access (S111).

In a case where the migration policy is configured to the host I/O priority mode, and, in addition, the type of write access is sequential access (S111: YES), the controller 100 responds to the host 20 to the effect that the write command processing is complete (S113).

In a case where either the migration policy is not configured to the host I/O priority mode, or the type of write access is random access (S111: NO), the controller 100 starts the synchronous copy processing program P12 (S112). After the synchronous copy processing has ended, the controller 100 responds to the host 20 to the effect that the write command processing is complete (S113).

In this example, which is configured in this manner, the controller 100 selects the asynchronous copy process:
  (1) in a case where the host I/O priority mode is selected, and, in addition, the number of write accesses NW to the migration-source volume per unit of time is equal to or less than the threshold Th1; or
  (2) in a case where the host I/O priority mode is selected, and, in addition, the load DL on the migration-destination volume exceeds the threshold Th2; or
  (3) in a case where the host I/O priority mode is selected, and, in addition, access is sequential.

In a case where none of the above-mentioned (1) through (3) apply, the controller 100 selects the synchronous copy process.

Configuring this example like this achieves the same effects as the respective examples described above. In addition, in this example, the four criteria of migration policy setting, number of write accesses to the migration-source volume per unit of time, load on the migration-destination volume, and type of write access to the migration-source volume are comprehensively taken into account as determination criteria for selecting one of either the synchronous copy process or the asynchronous copy process. Therefore, a write command can be processed even more appropriately during data migration processing, and the data migration processing can be completed promptly.

EXAMPLE 6

Example 6 will be explained by referring to FIG. 18. In the respective examples described hereinabove, a case in which a migration-source volume and a migration-destination volume reside inside the same enclosure was explained. Instead, in this example, a case in which the migration-source volume and the migration-destination volume are disposed in respectively different enclosures will be explained.

FIG. 18 shows the overall configuration of a system according to this example. A first storage control apparatus 10(1) and a second storage control apparatus 10(2) are provided as the storage system. The first storage control apparatus 10(1) and the second storage control apparatus 10(2) are coupled together to enable two-way communications via an inter-apparatus communication network CN30. In FIG. 18, for the sake of convenience, the management terminal 30 is not shown, but a management terminal 30 can also be disposed in the system of this example.

A controller 100(1) of the first storage control apparatus 10(1) comprises a CHA 110, a DKA 120, a cache memory 130, a shared memory 140, a CPU 150, a local memory 160, and a data controller 170 (none of which are shown in the drawing) the same as the controller 100 described in the respective examples explained above.

The various types of computer programs P10 through P14 and the various types of management tables T11 through T14 shown in FIG. 3 are stored in the controller 100(1). For convenience sake, only four of the computer programs P10 through P14 are shown in FIG. 18.

In FIG. 18, only the controller 100(1) of the first storage control apparatus 10(1) is depicted as comprising the computer programs P10 through P13 and so forth, but in actuality, the controller 100(2) of the second storage control apparatus 10(2) can also be configured the same as the controller 100(1).

Therefore, the configuration can be such that, of multiple volume pairs for which data migration processing is being carried out, a number of migration-source volumes reside inside the first storage control apparatus 10(1) and another number of migration-source volumes reside inside the second storage control apparatus 10(2).

Furthermore, the present invention is not limited to the respective examples described hereinabove, and various changes are possible without departing from the gist thereof. For example, in Example 5, a case in which the four criteria of migration policy setting, number of write accesses to the migration-source volume per unit of time, load on the migration-destination volume, and type of write access to the migration-source volume are comprehensively taken into account is described. Instead, the configuration may be such that either the synchronous copy process or the asynchronous copy process is selected based on a combination of any two or more of these determination criteria (prescribed information).

[Reference Signs List]
1, 10 Storage system
3A Migration-source volume
3B Migration-destination volume
5, P10 Data migration processing part
6A, P12 Synchronous copy processing part
6B, P13 Asynchronous copy processing part
7, P11 Copy control part

The invention claimed is:

1. A storage system, which includes multiple logical volumes,
the storage system comprising:
a data migration processing part for executing a data migration process, which transfers data of a migration-source volume selected from among the multiple logical volumes and stores this data in a migration-destination volume selected from among the multiple logical volumes;
a synchronous copy processing part for executing a synchronous copy process, which notifies a higher-level apparatus that write processing is complete after write data received from the higher-level apparatus has been written to the migration-source volume and the migration-destination volume;
an asynchronous copy processing part for executing an asynchronous copy process, which notifies the higher-level apparatus that write processing is complete when write data received from the higher-level apparatus has been written to the migration-source volume, and writes thereafter the write data to the migration-destination volume; and
a copy processing part, which, in a case where write data targeted at the migration-source volume is received from the higher-level apparatus during the data migration process, selects and executes one of the synchronous copy process and the asynchronous copy process based on prescribed information.

2. A storage system according to claim 1, wherein
the prescribed information includes migration policy information, number of write accesses information, migration destination load information, and access type information,
the migration policy information is information for specifying beforehand whether to select the synchronous copy process or the asynchronous copy process,
the number of write accesses information denotes the number of write accesses to the migration-source volume per unit of time,
the migration destination load information denotes the load on the migration-destination volume,
the access type information denotes whether a write access targeted at the migration-source volume is a random access or a sequential access, and
the copy control part selects the asynchronous copy process in a case where the migration policy information denotes the asynchronous copy process, and, in addition, the number of write accesses denoted in the number of write accesses information is equal to or less than a prescribed access threshold, or in a case where the migration policy denotes the asynchronous copy process, and, in addition, the load denoted in the migration destination load information exceeds a prescribed load threshold, or in a case where the migration policy information denotes the asynchronous copy process, and, in addition, the access type information denotes the sequential access, and selects the synchronous copy process in all other cases.

3. A storage system according to claim 1, wherein the prescribed information includes migration policy information for specifying beforehand whether to select the synchronous copy process or, the asynchronous copy process, and
the copy control part selects the synchronous copy process in a case where the migration policy information denotes the synchronous copy process, and selects the asynchronous copy process in a case where the migration policy information denotes the asynchronous copy process.

4. A storage system according to claim 1, wherein
the prescribed information includes number of write accesses information denoting the number of write accesses to the migration-source volume per unit of time, and
the copy control part selects the asynchronous copy process in a case where the number of write accesses is equal to or less than a prescribed access threshold, and selects the synchronous copy process in a case where the number of write accesses exceeds the prescribed access threshold.

5. A storage system according to claim 4, wherein the access threshold is configured as a speed of copying data from the migration-source volume to the migration-destination volume.

6. A storage system according to claim 1, wherein
the prescribed information includes migration destination load information denoting a load on the migration-destination volume, and
the copy control part selects the asynchronous copy process in a case where the load exceeds a prescribed load threshold, and selects the synchronous copy process in a case where the load is equal to or less than the prescribed load threshold.

7. A storage system according to claim 6, wherein the migration-destination volume is associated with one or more storage devices, and another logical volume, which differs from the migration-destination volume, is disposed in the storage device.

8. A storage system according to claim 1, wherein
the prescribed information includes access type information denoting whether a write access targeted at the migration-source volume is a random access or a sequential access, and
the copy control part selects the asynchronous copy process in a case where the write access is the sequential access, and selects the synchronous copy process in a case where the write access is the random access.

9. A storage system according to claim 1, wherein
a migration-source cache memory area corresponding to a migration-source volume storage area, and a migration-destination cache memory area corresponding to a migration-destination volume storage area are provided,
write data, received from the higher-level apparatus and targeted at the migration-source volume, is written to a storage device associated with the migration-source volume in accordance with a cache management process after being stored in the migration-source cache memory area, and
write data, which is copied to the migration-destination volume, is written to a storage device associated with the migration-destination volume in accordance with the cache management process after being transferred from the migration-source cache memory area and stored in the migration-destination cache memory area.

10. A storage system according to claim 1, wherein
the migration-source volume and the migration-destination volume are disposed inside the same enclosure,
the migration-source volume and the migration-destination volume are controlled by the same controller, and
the controller has a microprocessor, a control memory used by the microprocessor and a cache memory, a higher-level communication interface circuit for communicating with the higher-level apparatus, and a lower-level communication interface circuit for communicating with the migration-source volume and the migration-destination volume, and wherein
the data migration processing part, the synchronous copy processing part, the asynchronous copy processing part, and the copy control part are realized by the microprocessor that reads and executes a prescribed computer program stored in the control memory.

11. A storage system according to claim 10, wherein
a management terminal is coupled to the controller, and
at least a portion of the prescribed information is inputted to the controller by way of the management terminal.

12. A storage system according to claim 1, wherein
the migration-source volume is controlled by a first controller,
the migration-destination volume is controlled by a second controller, which is coupled to the first controller so as to enable two-way communications, and
the first controller has the data migration processing part, the synchronous copy processing part, the asynchronous copy processing part, and the copy control part.

13. A method for controlling a data migration process for migrating data from a migration-source volume to a migration-destination volume,
the method causing a computer that manages the migration-source volume and the migration-destination volume to execute:
a step of executing the data migration process for transferring data of the migration-source volume and storing this data in the migration-destination volume;
a step of storing write data in a migration-source cache memory area associated with the migration-source volume in a case where the write data, which is targeted at the migration-source volume, has been received from a higher-level apparatus while the data migration process is being executed;
a step of selecting one of a synchronous copy process and an asynchronous copy process based on prescribed information;
a step of, in a case where the synchronous copy process has been selected, notifying the higher-level apparatus that write processing is complete after the write data stored in the migration-source cache memory area has been transferred to a migration-destination cache memory area associated with the migration-destination volume; and
a step of, in a case where the asynchronous copy process has been selected, notifying the higher-level apparatus that write processing is complete prior to transferring the write data stored in the migration-source cache memory area to the migration-destination cache memory area.

* * * * *